(12) United States Patent
Srivastava et al.

(10) Patent No.: US 11,550,308 B2
(45) Date of Patent: Jan. 10, 2023

(54) DYNAMIC VALUE STREAM MANAGEMENT

(71) Applicant: Dynamic Flow Systems, LLC, Sun Prairie, WI (US)

(72) Inventors: Himanshu Srivastava, Sun Prairie, WI (US); Brandon Flexsenhar, Gurnee, IL (US)

(73) Assignee: Dynamic Flow Systems, LLC, Sun Prairie, WI (US)

(*) Notice: Subject to any disclaimer, the term of this patent is extended or adjusted under 35 U.S.C. 154(b) by 146 days.

(21) Appl. No.: 17/162,951

(22) Filed: Jan. 29, 2021

(65) Prior Publication Data

US 2021/0240172 A1 Aug. 5, 2021

Related U.S. Application Data

(60) Provisional application No. 62/967,638, filed on Jan. 30, 2020.

(51) Int. Cl.
*G05B 19/418* (2006.01)
*H04L 67/12* (2022.01)

(52) U.S. Cl.
CPC ........ *G05B 19/41865* (2013.01); *H04L 67/12* (2013.01); *G05B 2219/32117* (2013.01)

(58) Field of Classification Search
None
See application file for complete search history.

(56) References Cited

U.S. PATENT DOCUMENTS

| | | | |
|---|---|---|---|
| 6,816,747 B2 | 11/2004 | Mammoser et al. | |
| 6,993,492 B2 | 1/2006 | George et al. | |
| RE44,188 E | 4/2013 | Adra | |
| 2004/0039625 A1 | 2/2004 | Malnack et al. | |
| 2004/0162745 A1* | 8/2004 | Rodrigue | G06Q 10/06395 705/7.41 |
| 2005/0234766 A1 | 10/2005 | Shuker | |
| 2007/0078531 A1* | 4/2007 | Adra | G06Q 10/00 700/36 |
| 2010/0225447 A1* | 9/2010 | Adra | G01S 5/0294 340/10.1 |
| 2012/0053976 A1* | 3/2012 | Hu | G06Q 10/06311 705/7.13 |
| 2012/0117114 A1* | 5/2012 | Goranson | G06N 5/00 707/E17.098 |
| 2015/0363673 A1* | 12/2015 | Goranson | G06V 30/274 382/103 |
| 2022/0244437 A1* | 8/2022 | Mangeney | G02F 1/01 |

* cited by examiner

*Primary Examiner* — Philip Wang

(74) *Attorney, Agent, or Firm* — Thomas | Horstemeyer LLP

(57) ABSTRACT

Various embodiments are described for dynamic value stream management. A computing environment is directed to receive a stream of metrics from station computing devices each positioned at a station in a manufacturing process, where individual ones of the station computing devices have a sensor configured to generate metrics. The computing environment may determine an optimal allocation of resources for each of the stations in the manufacturing process based at least in part on the metrics. If a cycle time of a station falls below a threshold, personnel from another satisfactorily-performing station may be reassigned to the station based on cross-training metrics. A recommended action for the stations may be determined and presented in a display device.

20 Claims, 27 Drawing Sheets

Resource Management

Home > Resource Management

Cross Training Matrix

| Location* | Value Stream* | Department* |
|---|---|---|
| USA | ThomKatt | Assembly |

Search

| Last Name | First Name | Classification | Job Flexibility % | Testing | Test Process 1 | Test Process 2 | Test Process Step | mttest | kycptm | kycprocess | samplename | Test add new proc |
|---|---|---|---|---|---|---|---|---|---|---|---|---|
| Russel | Mark | jobDuty | 10% | 1 | 2 | 1 | 3 | 1 | 1 | 1 | 1 | 1 |
| Pray | Porche | 1 | 20% | 1 | 3 | 1 | 3 | 1 | 1 | 1 | 1 | 1 |
| One | Analystc | sd | 0% | 1 | 1 | 1 | 1 | 1 | 1 | 1 | 1 | 1 |
| Jackson | Edison | 1 | 0% | 1 | 2 | 1 | 2 | 1 | 1 | 1 | 1 | 1 |
| Sahay | Ronita | 1 | 10% | 1 | 1 | 1 | 3 | 1 | 1 | 1 | 1 | 1 |
| User | Normal | Tester | 0% | 1 | 1 | 1 | 1 | 1 | 1 | 1 | 1 | 1 |
| Leaton | Kym | Job Duty | 0% | 1 | 1 | 1 | 1 | 1 | 1 | 1 | 1 | 1 |
| WithPhoto | User | userForm | 0% | 1 | 1 | 1 | 1 | 1 | 1 | 1 | 1 | 1 |
| Srivastava | Himanshu | Admin | 0% | 1 | 1 | 1 | 1 | 1 | 1 | 1 | 1 | 1 |
| Kohli | Virat | Tester | 0% | 1 | 1 | 1 | 1 | 1 | 1 | 1 | 1 | 1 |
| Dhoni | MS | Tester | 0% | 1 | 1 | 1 | 1 | 1 | 1 | 1 | 1 | 1 |
| User | Multi | dutyJob | 0% | 1 | 1 | 1 | 1 | 1 | 1 | 1 | 1 | 1 |

Update

Card Details -- CARB000005                                                        ×

| Card Details | DEFINE | MEASURE | ANALYZE | IMPROVE | CONTROL | CLOSED |

What (Part, Action, Phase, Operation)?:*  | test answer41 |

Who (Shift, Team Member, Owner):*  | test answer42 |

Where (Which step in the process, location)?:*  | test answer43 |

When (Time, Date, Duration, Frequency)?:*  | test answer44 |

How many (Units, Equipment, Procedures) impacted?:*  | test answer45 |

Clearly identify the object and its defect?:  | |

Clarify and Describe the Symptom:  | |

Identify the Gap Between Current and Desired State:

B  I  U        Normal

Test answer       IMG_1.JPG

Initiate Containment Action:

[Close]                                                              [Update]

*FIG. 9*

| Process Step* | | Status* | | Actual Date* | |
|---|---|---|---|---|---|
| Pedestal Assembly | ˅ | Closed | ˅ | 12/30/2020 | ˅ |

| Created By | | Created On | Updated By | | Updated On |
|---|---|---|---|---|---|
| Michael Shatkins | ˅ | 05/28/2020 | Michael Shatkins | ˅ | 05/28/2020 |

| Description | Question | 1 | 2 | 3 | 4 | 5 |
|---|---|---|---|---|---|---|
| 1. Sorting | There is no excess job staging or WIP in the work area. | ○ | ○ | ○ | ● | ○ |
| | There is no excess inventory on or around the flow racks. All bins are appropriately sized for the quantity required. | ○ | ○ | ● | ○ | ○ |
| | There is no excess job staging or WIP in the work area. | ○ | ○ | ○ | ● | ○ |
| | There are no unidentified work stools, carts, ladders, fixtures, etc., in the work area. | ○ | ○ | ○ | ● | ○ |
| | The work area is free of excessive personal belongings. | ○ | ○ | ● | ○ | ○ |
| 2. Systemizing | The work stations are labeled with the required tooling. | ○ | ○ | ○ | ○ | ● |
| | The bins and baskets with inventory storage are labeled. | ○ | ○ | ○ | ● | ○ |
| | Components and tooling are put in their proper locations. | ○ | ○ | ○ | ● | ○ |
| | Trash can, carts, work stations, ladders, etc. are properly marked and adhered to. | ○ | ○ | ○ | ● | ○ |
| | Cleaning equipment is in the proper, identified location. | ○ | ○ | ○ | ● | ○ |
| 3. Straightening Up | The floor is clean and garbage is emptied. | ○ | ○ | ○ | ● | ○ |
| | Work stations, material carts, etc. are clean and ready to use. | ○ | ○ | ● | ○ | ○ |
| | All equipment, fixtures, ladders, stools, are free of dust and stray parts. | ○ | ○ | ● | ○ | ○ |
| | Are all storage racks are neat, orderly, and clean. | ○ | ○ | ● | ○ | ○ |
| | Walls, cranes, posts, etc. are clean. | ○ | ○ | ● | ○ | ○ |
| 4. Standardizing | Daily 6S checklists are being filled out. | ○ | ○ | ● | ○ | ○ |
| | All 6S color standards are being followed. | ○ | ○ | ○ | ● | ○ |
| | Standard work element sheets are posted and current. | ○ | ○ | ○ | ○ | ● |

New 6S Card

Title*: PMA

Date*: 05/10/2019

Location*: Select

Value Stream*: Select

Department*: Select

Process Step*: Select

Name: Mark Russel

Email: admin@admin.com

Description: B U I
Insert text here...

Cancel   Reset   Save

Dynamic Flow Systems

Manufacturing Toolkit — Home > Manufacturing Toolkit

Constraint Management

Location*: USA
Value Stream*: Thomaskat
Department*: Assembly

[Add Production Order]

Takt Time 605: 27:48 [Pause]
Index 615: 2 [Refresh Index]

① Fit Frame — 620a
- PO Number: Dum01
- No of People: 0
- Open 6S Cards: 0
- Open CI Cards: 0
- Cycle Time: 0:0
- Reject Rate: 0
- Efficiency: 0
- 0.0

Delta: 4 — 625
630

② Put Wheels — 620b
- PO Number: Dum02
- No of People: 0
- Open 6S Cards: 0
- Open CI Cards: 0
- Cycle Time: 0:0
- Reject Rate: 0
- Efficiency: 0
- 0.0

Delta: 0
53072.25

③ Wiring and Elec... — 620c
- PO Number: Dum03
- No of People: 0
- Open 6S Cards: 0
- Open CI Cards: 0
- Cycle Time: 0:0
- Reject Rate: 0
- Efficiency: 0
- 0.0

Delta: 0
53072.25

④ Sensors and Boards — 620d
- PO Number: Dum04
- No of People: 0
- Open 6S Cards: 0
- Open CI Cards: 0
- Cycle Time: 0:0
- Reject Rate: 0
- Efficiency: 0
- 0.0

218043.40

⑤ Paint — 620e
- PO Number: Dum05
- No of People: 0
- Open 6S Cards: 0
- Open CI Cards: 0
- Cycle Time: 0:0
- Reject Rate: 0
- Efficiency: 0
- 0.0

Delta: 0
53072.25

⑥ Polish — 620f
- PO Number: Dum06
- No of People: 0
- Open 6S Cards: 0
- Open CI Cards: 0
- Cycle Time: 0:0
- Reject Rate: 0
- Efficiency: 0
- 0.0

Delta: 0
53072.25

⑦ Quality Test — 620g
- PO Number: Dum07
- No of People: 0
- Open 6S Cards: 0
- Open CI Cards: 0
- Cycle Time: 0:0
- Reject Rate: 0
- Efficiency: 0
- 0.0

Delta: 0
...

⑧ Test Ride — 620n
- PO Number: Dum08
- No of People: 0
- Open 6S Cards: 0
- Open CI Cards: 0
- Cycle Time: 0:0
- Reject Rate: 0
- Efficiency: 0
- 0.0

Fit Frame

| PO Number | Dum01 |
|---|---|
| No of People | 0 |
| Open 6S Card | 0 |
| Open CI Cards | 0 |
| Cycle Time | 5:30 |
| Reject Rate | 0 |
| Efficiency | 545.45 |

620

625 Delta
2

Fit Frame

Process Action Process Instructions

Serial Number

End Material Defect        Send Message        Finish

Finish Time

---

Add Andon Event

Reason*      Status*

[Select ▼]      [I need help]

Description

[Max limit 120 characters]

Add Andon

List of Andon Current Events

No current andon events, please create new event.

Cancel

Defect Dashboard | Archive Defects

Location* [Select]  Value Stream [Select]  Department [Select]  Process Step [Select]

[Search] [Reset]

[Search PO or SN or DEF]

Defects

| Defect No. | Process Step | Process Name | Production Order | Short Description | Defect Status | Created Date |
|---|---|---|---|---|---|---|
| DEF08744 | QG-PDI | BSF47 | 7148635104 | Swing out lock wrong way... | Closed | 29-Dec-2020 |
| DEF08743 | QG-Finals Ops Outgoing | BSF47 | 7148635104 | 3 in lights B-arm light not working.... | Closed | 29-Dec-2020 |
| DEF08742 | QG-Finals Ops Outgoing | BSF47 | 7148635104 | Clean label on A-cylinder | Closed | 29-Dec-2020 |
| DEF08741 | QG-Finals Ops Outgoing | BSF47 | 7148635104 | T\U b-c joint | Closed | 29-Dec-2020 |
| DEF08740 | QG-Finals Ops Outgoing | BSF47 | 7148635104 | Mark and cap b-c joint | Closed | 29-Dec-2020 |
| DEF08739 | QG-Finals Ops Outgoing | BSF47 | 7148635104 | Wire hanging out of 3 in-line | Closed | 29-Dec-2020 |
| DEF08738 | QG-Finals Ops Outgoing | BSF47 | 7148635104 | Missing round cover on FFH hous... | Closed | 29-Dec-2020 |
| DEF08737 | QG-Finals Ops Outgoing | BSF47 | 7148635104 | Mark and cap boom rest sensor | Closed | 29-Dec-2020 |
| DEF08736 | QG-Finals Ops Outgoing | BSF47 | 7148635104 | T\U boom head edge by slewing.... | Closed | 29-Dec-2020 |
| DEF08735 | QG-Finals Ops Outgoing | BSF47 | 7148635104 | Missing FFH cover | Closed | 29-Dec-2020 |
| DEF08734 | QG-Finals Ops Outgoing | BSF47 | 7148635104 | Missing w\b cover | Closed | 29-Dec-2020 |
| DEF08733 | QG-Finals Ops Outgoing | BSF47 | 7148635104 | Zip tie wire by accumulator boom... | Closed | 29-Dec-2020 |
| DEF08732 | QG-Finals Ops Outgoing | BSF47 | 7148635104 | Mark and cap p\s and d\s o\r c | Closed | 29-Dec-2020 |
| DEF08731 | QG-Finals Ops Outgoing | BSF47 | 7148635104 | Fuel handle interfaces with co... | Closed | 29-Dec-2020 |
| DEF08730 | QG-Finals Ops Outgoing | BSF47 | 7148635104 | Missing air line wash out fit... | Closed | 29-Dec-2020 |
| DEF08729 | QG-Finals Ops Outgoing | BSF47 | 7148635104 | O\S on p\s\r of deck | Closed | 29-Dec-2020 |
| DEF08728 | QG-Finals Ops Outgoing | BSF47 | 7148635104 | T\U p\s\r of truck by side mar... | Closed | 29-Dec-2020 |
| DEF08727 | QG-Finals Ops Outgoing | BSF47 | 7148635104 | Missing plug on p\s of hopper... | Closed | 29-Dec-2020 |

FIG. 23

Defect Correction    Defect Verification

Defect Entry Section

| Defect Entry Type* | Country Region* | Date of Failure* | Production Order* |
|---|---|---|---|
| IPV | USA | 12/29/2020 | 71486635104 |

| Location Detected* | Value Stream Detected | Department Detected | Process Step Detected* |
|---|---|---|---|
| PMA | Final Operations | Final Finish | QG – Final Ops Outgoing |

Product Line
BSF 47        ○ New   ● Found   ○ Missed   ☐ Machine Down

Customer
Unruh

Defect Description
Clean label on A-cylinder.

Status*
Closed

Reopen Reason

Defect Owner
Bob Fischer

Defect Pictures

*FIG. 24*

DYNAMIC VALUE STREAM MANAGEMENT

CROSS-REFERENCE TO RELATED APPLICATION

This application claims the benefit of and priority to U.S. Provisional patent Application No. 62/967,638 filed Jan. 30, 2020 entitled "DYNAMIC VALUE STREAM MANAGEMENT," the contents of which being incorporated by reference in their entirety herein.

BACKGROUND

Assembly lines and similar manufacturing operations are generally performed using a series of predetermined operations, referred to in the field as process steps. A value stream map may be employed to visually represent a series of process steps. Value stream mapping is a foundational tool of lean manufacturing. Historically, value stream maps are used to document the current state of an operation and develop a plan to improve the operation into a future state. This transformation is based on customer demand and balances each process step to create flow. Value-added time and non-value-added time are assessed to develop an implementation plan for the transformation. Additionally, value stream maps may be used to monitor process steps in real-time and adjust resources within the value stream.

Traditional value stream maps, however, are static and do not track real-time performance of a value stream. Because of a lack of real-time management tools, team leaders are unable to effectively adjust resources to address losses and constraints. Constraints may be caused by personnel waiting on materials or personnel waiting on other stations to complete their tasks, for example. However, because conventional value stream management solutions cannot determine a real-time status of a value stream, these solutions are reactive. That is, problems may be detected and stopped from reoccurring, but are not addressed when they occur.

BRIEF SUMMARY OF INVENTION

According to a first aspect, a system is described including at least one computing device comprising at least one hardware processor, and program instructions stored in memory and executable in the at least one computing device that, when executed, direct the at least one computing device to: receive a stream of metrics from a plurality of station computing devices each positioned at one of a plurality of stations in a manufacturing process, individual ones of the station computing devices comprising at least one sensor configured to generate metrics in the stream of metrics; determine an optimal allocation of resources for each of the stations in the manufacturing process based at least in part on the metrics in the stream of metrics and display the optimal allocation of resources in at least one user interface; determine that a first cycle time of a first one of the stations exceeds a threshold based at least in part on an analysis of a first subset of the stream of metrics corresponding to the first one of the stations; determine that a second cycle time of a second one of the stations falls below a threshold based at least in part on an analysis of a second subset of the stream of metrics corresponding to the second one of the stations; in response to the cycle time for the second one of the stations falling below the threshold, identify a plurality of entries in an assignment database corresponding to the second one of the stations; select at least one of the entries in the job assignment database based at least in part on a cross-training metric generated that corresponds to the at least one entry; and send a notification to an administrator client device that comprises a recommended action for the second one of the stations determined based at least in part on the at least one of the entries in the job assignment database.

The metrics in the stream of metrics may include timestamp data received from the station computing devices at a predefined time interval. The at least one computing device may be further directed to: determine the cycle time for the first one of the stations based at least in part on at least one first station job-in event, wherein the at least one first station job-in event is extracted from the timestamp data; and determine the cycle time for the second one of the stations based at least in part on at least one second station job-in event and at least one second station job-out event, wherein the at least one second station job-in event and the at least one second station job-out event are extracted from the timestamp data.

The at least one entry from the plurality of entries in the job assignment table may be selected based on a status of the second one of the stations and a status of at least one respective queue associated with the second one of the stations. The at least one computing device may be further directed to: determine a status of individual ones of the stations based at least in part on the timestamp data; and determine a status of individual queues of a plurality of queues associated with the stations based at least in part on the timestamp data.

The at least one computing device may be further directed to: encode for rendering on a user interface an indication of a status of individual stations of a plurality of stations; and encode for rendering on the user interface an indication of a status of individual queues of a plurality of queues associated with the stations. The recommended action may include transferring at least one individual corresponding to the at least one entry from the second one of the stations to the first one of the stations. The cross-training metric may include an indication that an individual is fully-trained, in-training, or untrained with respect to a process associated with the second one of the stations.

The at least one computing device may be further directed to: access a timestamp dataset from a data store, the timestamp dataset comprising timestamp data for a plurality of intervals over a period of time; determine an underperformance frequency for respective ones of the stations based at least in part on the timestamp data, the underperformance frequency comprising a frequency that a cycle time of the respective stations fell below the threshold over the period of time; and determine that a third one of the stations has a highest underperformance frequency among the plurality of stations. The at least one computing device may be further directed to: generate at least one user interface comprising a value stream map; and dynamically update the value stream map as updated metrics in the stream of metrics are received.

In a second aspect, a computer-implemented method is described, comprising: receiving a stream of metrics from a plurality of station computing devices each positioned at one of a plurality of stations in a manufacturing process, individual ones of the station computing devices comprising at least one sensor configured to generate metrics in the stream of metrics; determining an optimal allocation of resources for each of the stations in the manufacturing process based at least in part on the metrics in the stream of metrics and displayed the optimal allocation of resources in at least one user interface; determining that a first cycle time of a first one of the stations exceeds a threshold based at least in part on an analysis of a first subset of the stream of metrics corresponding to the first one of the stations; determining that a second cycle time of a second one of the stations falls below a threshold based at least in part on an analysis of a second subset of the stream of metrics corresponding to the second one of the stations; in response to the cycle time for the second one of the stations falling below the threshold, identifying a plurality of entries in an assignment database corresponding to the second one of the stations; selecting at least one of the entries in the job assignment database based at least in part on a cross-training metric generated that corresponds to the at least one entry; and sending a notification to an administrator client device that comprises a recommended action for the second one of the stations determined based at least in part on the at least one of the entries in the job assignment database.

The metrics in the stream of metrics may include timestamp data received from the station computing devices at a predefined time interval. The computer-implemented method may further include: determining the cycle time for the first one of the stations based at least in part on at least one first station job-in event, wherein the at least one first station job-in event is extracted from the timestamp data; and determining the cycle time for the second one of the stations based at least in part on at least one second station job-in event and at least one second station job-out event, wherein the at least one second station job-in event and the at least one second station job-out event are extracted from the timestamp data.

The at least one entry from the plurality of entries in the job assignment table is selected based on a status of the second one of the stations and a status of at least one respective queue associated with the second one of the stations. The method may further include determining a status of individual ones of the stations based at least in part on the timestamp data; and determining a status of individual queues of a plurality of queues associated with the stations based at least in part on the timestamp data.

The method may further include encoding for rendering on a user interface an indication of a status of individual stations of a plurality of stations; and encoding for rendering on the user interface an indication of a status of individual queues of a plurality of queues associated with the stations. The recommended action may include transferring at least one individual corresponding to the at least one entry from the second one of the stations to the first one of the stations.

The cross-training metric may include an indication that an individual is fully-trained, in-training, or untrained with respect to a process associated with the second one of the stations. The method may further include accessing a timestamp dataset from a data store, the timestamp dataset comprising timestamp data for a plurality of intervals over a period of time; determining an underperformance frequency for respective ones of the stations based at least in part on the timestamp data, the underperformance frequency comprising a frequency that a cycle time of the respective stations fell below the threshold over the period of time; and determining that a third one of the stations has a highest underperformance frequency among the plurality of stations. The method may further include generating the at least one user interface to comprise a value stream map; and dynamically updating the value stream map as updated metrics in the stream of metrics are received.

BRIEF DESCRIPTION OF THE DRAWINGS

Many aspects of the present disclosure may be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 shows an example of a user interface including a cross-training matrix for resource management according to various embodiments.

FIG. 7 shows an example of a user interface including a corrective action review dashboard according to various embodiments.

FIG. 8 shows an example of a user interface that may be employed to generate and view corrective action data for a corrective action review board card according to various embodiments.

FIG. 9 shows an example of another user interface that may be employed to generate and view corrective action data for a corrective action review board card according to various embodiments.

FIG. 11 shows an example of a user interface that may be employed to generate data for a 6S evaluation according to various embodiments.

FIG. 12 shows an example of a user interface that may be employed to generate 6S data to create a new a 6S card according to various embodiments.

FIG. 15 shows an example of a user interface that may be employed to generate and view continuous improvement data for a continuous improvement card according to various embodiments.

FIG. 16 shows an example of a user interface for a manufacturing toolkit that may be employed to analyze various metrics for various stations in a manufacturing process according to various embodiments.

FIG. 17 shows another example of a user interface for a manufacturing toolkit that may be employed to analyze various metrics for various stations in a manufacturing process according to various embodiments.

FIG. 18 shows an example of a user interface for specifying an internal defect according to various embodiments.

FIG. 19 is an example of a user interface for assigning personnel to various processes and/or stations according to various embodiments.

FIG. 21 is an example of a user interface showing key performance indicators for various processes according to various embodiments.

FIGS. 22-24 are examples of a user interface for defect tracking, follow-through, root-cause-corrective-action (RCCA), and analytics according to various embodiments.

DETAILED DESCRIPTION

Figure 1:
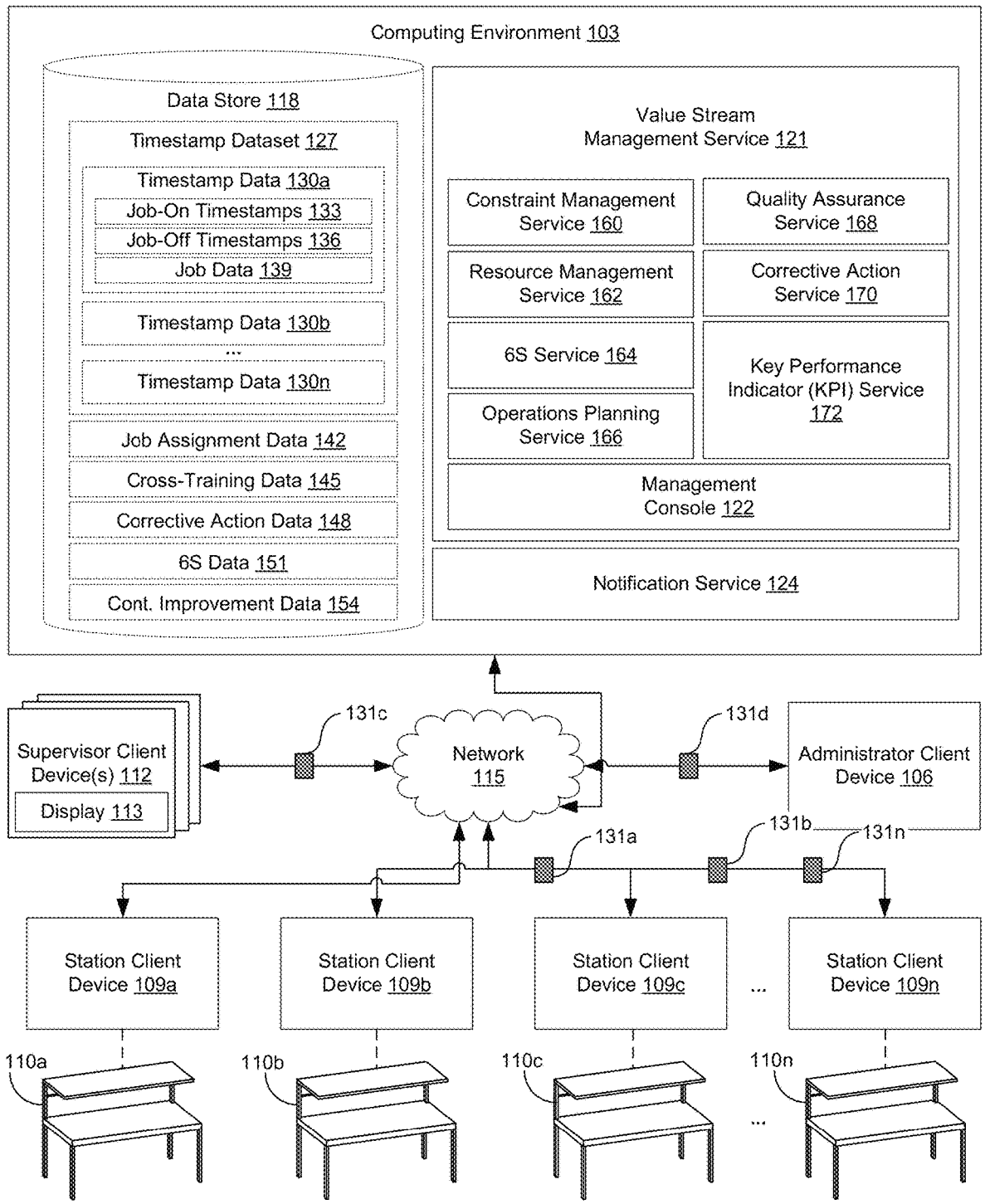
FIG. 1 shows an example of a networked environment for real-time management of a value stream according to various embodiments.

The present disclosure relates to dynamic value stream management. More specifically, the present disclosure relates to a software-as-a-service (SaaS) lean manufacturing platform for dynamically managing a value stream. The disclosed platform offers solutions to increase operational intelligence through data driven lean toolkits.

Accordingly, the present disclosure includes systems and computer-implemented methods for enabling predictive analytics for operational improvement of a value stream. According to various embodiments, a computing environment is employed to retrieve data collected from an enterprise resource planning (EPR) system or a manufacturing execution system (MES) (or data collected directly from a value stream) as metrics in a stream of metrics, and determine an optimal allocation of manpower based on several factors. These factors may include, for example, a current state of a dynamic value stream map, a digital cross-training matrix, a digital job assignment table, and other factors as described herein. Depending on the state of these factors, the computing environment may detect constraints in the value stream and decide how to better allocate resources.

Compared to the existing state of the art, over time, the computing environment described herein may detect trends such as absenteeism, productivity changes, coverage risks due to lack of training, and other manpower deficiencies and generate suggestions that, if implemented, better plan capacity and further optimize the optimal allocation of resources. As such, the computing environment may provide a constantly balanced operation by moving a flexible workforce in a real-time manner. As such, embodiments described herein are not traditional value stream maps. Rather, the embodiments described herein provide a holistic process monitoring tool that identifies constraints and determines a best or otherwise optimal manner for reallocation of resources to get a workflow back into balance.

In various embodiments, the computing environment described herein may generate and monitor a cycle time and a takt time of a value stream, as well as other metrics. As may be appreciated, the cycle time is the time taken to complete a process step in a value stream. The takt time is a lean manufacturing concept that refers to a required product assembly duration that matches demand. In takt time, all processes should be complete so that a line may be indexed. In a perfectly balanced line, all the process steps will finish in takt time and a line will be indexed so that cycle time is equal to takt time. Accordingly, an optimal allocation of resources may be determined such that it is ensured that the cycle time meets the takt time goal of an operation (e.g., a manufacturing operation).

Further, according to various embodiments, as the computing environment focuses on analyzing and optimizing manpower-based operations, the computing environment may perform digital lean evaluation to increase personnel engagement, improve speed of problem solving, and create more intelligent operations for administrators. The computing environment may permit administrators to increase their operational intelligence through data-driven lean toolkits.

For example, a first toolkit may include a constraint management service that monitors manufacturing processes and uses predictive analytics to remove constraints. Further, the constraint management service may perform scheduling assistance, provide "andon" system functionality, perform value added time analysis, and provide digital work instructions.

A second toolkit may include a resource management service that monitors manpower allocations and manages cross training to improve operational flexibility. The resource management service may generate recommendations to recommend ways to more effectively allocate manpower and develop a workforce in most impactful areas. A third toolkit may include a continuous improvement and 6S service, referred to herein as a 6S service, that submits digital audits or continuous improvement (CI) cards using a client device, such as a personal computer, a smartphone, tablet, or similar device. Tasks may be easily managed on digital workflow boards. These features make the oversight of process adherence very transparent and ensure the completion of open tasks.

A fourth toolkit may include a sales and operations planning service, herein referred to as an operations planning service. The operations planning service may manage capacity tools for balance supply and demand. Built-in Quality: Use digital checklists to capture quality data, effectively sort defects, and easily analyze trends to drive performance improvements. A fifth toolkit may include a corrective action service that generates a review board and drives structured root-cause-and-corrective-action (RCCA) activities by assigning and tracking the execution of A3 problem solving routines. A sixth toolkit may include a key performance indicator (KPI) service configured to generate at least one KPI board for display in a user interface. As such, the KPI service may digitize traditional shop floor management boards to obtain real time data and eliminate the cumbersome updating of metrics.

In the following discussion, a general description of the system and its components is provided, followed by a discussion of the operation of the same.

With reference to FIG. 1, a networked environment 100 is shown according to various embodiments. The networked environment 100 includes a computing environment 103, an administrator client device 106, a number of station client devices 109a . . . 109n (collectively "station client devices 109"), and one or more supervisor client devices 112 in data communication with each other via a network 115. The network may include, for example, the Internet, intranets, extranets, wide area networks (WANs), local area networks (LANs), wired networks, wireless networks, other suitable networks, or any combination of two or more such networks. For example, the networks may include satellite networks, cable networks, Ethernet networks, telephony networks, and other types of networks.

The computing environment 103 may include, for example, a server computer or any other system providing computing capability. Alternatively, the computing environment 103 may employ a plurality of computing devices that may be arranged, for example, in one or more server banks, computer banks, or other arrangements. Such computing devices may be located in a single installation or may be distributed among many different geographical locations. For example, the computing environment 103 may include a plurality of computing devices that together may include a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data may be stored in a data store 118 that is accessible to the computing environment 103. The data store 118 may be representative of a plurality of data stores 118 as may be appreciated. The data stored in the data store 118, for example, may be associated with the operation of the various applications and/or functional entities described below. The data stored in the data store 118 may include a timestamp dataset 127, cross-training data 145, job assignment data 142, corrective action data 148, sort, set-in-order, sustain, standardize, shine, and safety (6S) data 151, continuous improvement data 154, and other data as may be appreciated.

The timestamp dataset 127 may include timestamp data 130a . . . 130n associated with the station client devices 109 over one or more predetermined intervals of time. For instance, station client devices 109 (or "station computing devices 109") may include or be coupled to one or more sensors that generate metrics 131a . . . 131n (collectively "metrics 131") that are sent over the network 115 as a stream of metrics 131, for example. The metrics 131 in the stream of metrics 131 may include timestamp data 130 as well as other data, such as a number of operations performed per period of time, individuals associated with the station client device 109, and other information as may be appreciated.

The timestamp data 130a . . . 130n (collectively referred to as timestamp data 130) may include job-specific data for each station 110 associated with a station client device 109, such as data on what job is being performed, when a job is started, when a job is finished, and other data on a job being performed each station 110 over one or more predefined intervals of time. For example, timestamp data 103a may include data such as job-on timestamps 133, job-off timestamps 136, and job data 139 for a particular interval of time. The job-on timestamps 133 may include data on when a job is started at a station 110. The job-off timestamps 136 may include data on when a job is finished at a station 110. The job data 139 may include further data on a job being performed at a station 110, which may include operation confirmations, downtime tracking, and other data as may be appreciated.

The job assignment data 142 may include data on which personnel are assigned to each station 110. Personnel may include individuals, as may be appreciated, having training at a process or operation to be performed at a given station 110. When personnel are assigned to a station 110, the job assignment data 142 may be updated or modified to reflect that assignment. Likewise, if personnel is reassigned from one station 110 to another, the job assignment data 142 may be updated or modified to reflect that reassignment.

The cross-training data 145 may include data on which personnel (e.g., employees, contractors, or other individuals) are trained to work which stations 110. For example, the cross-training data 145 may include a training value that indicates that an individual is either untrained for a particular job, in-training for a particular job, or trained for a particular job. The cross-training data 145 may include a personnel flexibility score for each individual that may measure a job flexibility for the individual. The personnel flexibility score may be generated as a weighted function of a number of the stations 110 having a corresponding process that an individual is able to perform, a reliability metric determined as a function of a number of absences, tardiness, or lack thereof, an administrator score manually or programmatically assigned, as well as other metrics.

The cross-training data 145 may include a station flexibility score for each station 110 that may measure a job flexibility for the station 110. Like the personnel flexibility score, the station flexibility score determined for each station 110 may be generated as a weighted function of a number of the stations 110 having a corresponding process that an individual is able to perform, a reliability metric determined as a function of a number of absences, tardiness, or lack thereof, an administrator score manually or programmatically assigned, as well as other metrics. Notably, the flexibility score may be determined a function of an individual's ability to move to other process steps determined by what process steps an individual is quality to work as specified in the cross training matrix. The station flexibility score and/or the personnel flexibility score may be determined as a summation of weighted factors, where the factors x are metrics assigned to various factors, such as a number of absences, tardiness, or lack thereof, an administrator score manually or programmatically assigned, etc.

$$\text{Station Flexibility Score} = \omega_1 x_1 + \omega_2 x_2 + \ldots + \omega_n x_n \qquad (\text{eq. 1})$$

$$\text{Personnel Flexibility Score} = \omega_1 x_1 + \omega_2 x_2 + \ldots + \omega_n x_n \qquad (\text{eq. 2})$$

where $\omega$ is a weight assigned to a corresponding factor x.

In some embodiments, the weights assigned to various factors and/or the metrics for the factors may be determined using one or more machine learning routines, such as a convolutional neural network (CNN), an artificial neural network (ANN), or other suitable machine learning routine.

The corrective action data 148 may include data on one or more constraints that have been identified in a value stream. A constraint may include an issue caused by one or more stations 110 that reoccurs at a high frequency over a given time frame (e.g., has an occurrence interval exceeding a predetermined threshold). For example, a constraint could be identified for a station 110 that experienced a greater frequency of underperformance over a six-month period than any other station 110. The corrective action data 148 may include data identifying the constraint, a cause of the constraint, any actions to be taken to address constraint, and other data relating to the constraint as may be appreciated. The corrective action data 148 may be based on data used to create one or more corrective action review board cards, as will be described.

The 6S data 151 may include data on the operating conditions of one or more stations 110. In some embodiments, the 6S data 151 may include information on the sorting, systemizing, straightening up, standardizing, self-discipline, and safety of each station 110, referred to as six-sigma. The 6S data 151 may be based on data obtained from a supervisor client device 112. In some embodiments, the data obtained from the one or more supervisor client device 112 may include answers to one or more questions related to an evaluation of the operating conditions of a station 110. The 6S data 151 may further be based on data used to create one or more 6S cards.

The continuous improvement data 154 may include data identifying one or more continuous improvement items. A continuous improvement item in the continuous improvement data 154 may include information that may be employed to improve one or more processes or characteristics associated with a station 110. The continuous improvement data 154 may be based on data used to create one or more continuous improvement cards, as will be described.

The components executed on the computing environment 103 may include, for example, a value stream management service 121, a notification service 124, and other applications, services, processes, systems, engines, or functionality not discussed in detail herein. In some embodiments, the value stream management service 121 may include a constraint management service 160, a resource management service 162, a 6S service 164, an operations planning service 166, a quality assurance service 168, a corrective action service 170, a KPI service 172, as well as other services.

Generally, the value stream management service 121 may be executed in the computing environment 103 to perform various operations using the data stored in the data store 118. For example, the value stream management service 121 may receive timestamp data 130 from the administrator client device 106 or directly from the station client devices 109, for instance, as a stream of metrics 131 and determine an optimal allocation of resources based on the metrics 131. The value stream management service 121 may extract from the metrics 131 or timestamp data 130, the job-on timestamps 133, the job-off timestamps 136, and the job data 139. Using the metrics 131 and/or the timestamp data 130, the value stream management service 121 may track the cycle time progress of each station 110.

Accordingly, the value stream management service 121 may track a status of each station 110. A status of a station 110 may indicate the progress or completion of a job at the station 110 relative to the takt time for the value stream. The value stream management service 121 may determine the status of a station 110 at predefined intervals based on the timestamp data 130.

Even further, the value stream management service 121 may determine the status of a station 110 by comparing the takt time to a cycle time for the station 110. For example, a station 110 whose job is in progress with cycle time less than takt time may have a status of "on track." A station 110 whose job is completed with cycle time less than or equal to takt time may have a status of "ahead." A station 110 whose job is in progress with cycle time greater than takt time may have a status of "behind." A station 110 whose job is completed with cycle time greater than takt time may have a status of "late," and so forth.

The value stream management service 121 may track a status of a plurality of queues associated with the stations 110. For example, the value stream management service 121 may determine the status of a queue associated with a station at predefined intervals based on the timestamp data. A status of a queue may indicate a number of items in the queue. For example, a queue with one item may have a status of "normal." A queue with more than one item may have a status of "overloaded." A queue with no items may have a status of "empty." A queue with no items associated with a station 110 that is not performing a job may have a status of "starved," and so forth.

The value stream management service 121 may perform certain actions based on data stored in the data store 118. In some embodiments, if the value stream management service 121 determines that a station 110 has a status of behind, the value stream management service 121 may determine whether one or more personnel should be reassigned to that station 110. In some embodiments, the determination may be made based on only on the timestamp data 130, the job assignment data 142, and the cross-training data 145. In other embodiments, the determination may be made based on only on the timestamp data 130, the job assignment data 142, the cross-training data 145, as well as other data. For example, the value stream management service 121 may determine that a station 110 has a status of ahead based on the timestamp data 130. The value stream management service 121 may then access the job assignment data 142 to identify personnel assigned to the ahead station 110. The value stream management service 121 may determine whether personnel at the ahead station 110 are eligible for reassignment to the behind station 110 based on the cross-training data 145. If an individual's cross-training data 145 includes a training value indicating that the individual is trained for a job at the behind station 110, the value stream management service 121 may determine that the individual is eligible for reassignment from the ahead station 110 to the behind station 110.

Upon determining that personnel is eligible for reassignment, the value stream management service 121 may send a command to the notification service 124 instructing the notification service 124 to send to one or more supervisor client devices 112 a notification comprising a recommendation to reassign the individual(s). In some embodiments, if the recommendation is approved, the value stream management service 121 may receive an indication of the approval from the one or more supervisor client devices 112. In other embodiments, the personnel may be automatically assigned without requiring confirmation from a supervisor client device 112. In any event, the value stream management service 121 may then modify the job assignment data 142 to reflect the reassignment. In some embodiments, the value stream management service 121 may modify the job assignment data 142 to reflect the reassignment without receiving an indication of approval from the one or more supervisor client devices 112.

As another example, the value stream management service 121 may determine that a queue has a status of starved based on the timestamp data 130. The value stream management service 121 may then access the job assignment data 142 to identify personnel assigned to the station 110 associated with the starved queue. The value stream management service 121 may determine whether the personnel at the station 110 associated with the starved queue are eligible for reassignment to another station 110 based on the cross-training data 145.

If an individual's cross-training data 145 includes a training value indicating that the personnel is trained for a job at the other station 110, the value stream management service 121 may determine that the personnel is eligible for reassignment from the station 110 associated with the starved queue to the other station 110. The other station 110 may have a status of on track, ahead, behind, or late. In some embodiments, the value stream management service 121 may prioritize the other station 110 for reassignment if it has a status of behind.

The value stream management service 121 may create cards based on data stored in the data store 118. For example, the value stream management service 121 can create a corrective action review board card based on the corrective action data 148. Cards can also be created based on the 6S data 151 and the continuous improvement data 154.

The value stream management service 121 may access a timestamp dataset 127 to determine a frequency that a station 110 had a particular status during a period of time. The value stream management service 121 may identify a station 110 that had a highest frequency of behind statuses or a station 110 that had a frequency of behind statuses above a predefined threshold. The value stream management service 121 may then update the corrective action data 148 to reflect any constraints that are identified. For example, the value stream management service 121 may create a corrective action review board card with data identifying the constraint, as discussed in detail below.

The value stream management service 121 may provide a management console 122 having one or more user interfaces to view and configure various data and settings in the computing environment 103, as discussed in more detail below. In embodiments without a management console 122, however, these user interfaces may be accessible from a display 113 of supervisor client device 112.

The notification service 124 may be executed to send notifications to other devices in the networked environment 100 over the network 115. In some embodiments, the notification service 124 may send a notification to the supervisor client device 112 based on a status for a station 110 upon receiving a command from the value stream management service 121. The notification may include a recommended action for that station 110, as well as other data concerning the station 110. For example, the notification service 124 may receive from the value stream management service 121 an indication that personnel are eligible for reassignment from a first station 110 to a second station 110. The notification service 124 may then send a notification to a supervisor client device 112. This notification may include a recommendation that the personnel be reassigned from the first station 110 to the second station 110.

As another example, the notification service 124 may receive from the value stream management service 121 an indication that one or more personnel should be trained for one or more other jobs. The notification service 124 may then send a notification to a supervisor client device 112. This notification may include a recommendation that the one or more personnel be trained for the one or more other jobs.

The constraint management service 160 may be executed to monitor manufacturing processes and employ historical data to remove constraints. For instance, the management service 121 may identify trends in historical data and use the trends to make recommendations on how to better manage resources throughout the value stream. In some embodiments, the constraint management service 160 may perform scheduling assistance, providing andon system functionality, perform value added time analysis, and generate digital work instructions.

The resource management service 162 may effectively monitor manpower and other process allocations as well as manage cross-training to improve operational flexibility. In some embodiments, the resource management service 162 may generate recommendations to more effectively allocate manpower and develop workforce in most impactful areas.

The 6S service 164, also referred to as a continuous improvement and 6S service 164 may generate and submit digital audits or CI cards using a computing device. For instance, using the 6S service 164, tasks can be easily managed on digital workflow boards, which are rendered in various user interfaces. As such, the oversight of process adherence is very transparent and ensures completion of open tasks. The operations planning service 166 includes capacity tools that are shown in one or more user interface for balancing supply and demand.

The quality assurance service 168 may employ digital checklists to capture quality data, effectively sort defects, and easily analyze trends to drive performance improvements. The corrective action service 170, also referred to as a corrective action and review board service 170, may drive structured RCCA activities by assigning and tracking the execution of A3 problem solving. The key performance indicator service 172 may generate one or more user interfaces comprising a shop floor management board that displays and obtains real time data, thereby eliminating the cumbersome updating of metrics.

The administrator client device 106 may be configured to collect and process data from the station client devices 109. For instance, the administrator client device 106 may receive a job-on or a job-off event from the station client device 109. The administrator client device 106 may feed the computing environment 103 with this data at predefined intervals. The data may transfer in real-time, every ten minutes, every hour, or at any other interval of time as may be appreciated. In some embodiments without an administrator client device 106, the station client devices 109 may send the timestamp data 130 directly to the computing environment 103 as metrics 131, and the computing environment 103 may perform the functions of the administrator client device 106.

The station client devices 109 may each be associated with a station 110. The station client devices 109 may create a job-on event when a job is started at a station 110. The station client devices 109 may create a job-off event when a job is finished at a station 110. The station client devices 109 may send job on events, job off events, and other data to the administrator client device 106. In embodiments without an administrator client device 106, the station client devices 109 may send data directly to the computing environment 103.

The supervisor client devices 112 may each include a display 113 on which one or more user interfaces may be rendered. User interfaces rendered on the display 113 of the supervisor client devices 112 may be employed to view and configure various settings and data in the computing environment 103, as discussed in more detail below. In some embodiments, user interfaces accessible from the management console 122 may also be accessible from the display 113 of the supervisor client devices 112. In embodiments without a management console 122, these user interfaces may be accessible only from the display 113 of the supervisor client devices 112.

The supervisor client devices 112 may receive notifications from the notification service 124. A notification received from the notification service 124 may include, for example, a recommendation that personnel (e.g., individual or group of individuals) be reassigned from one station 110 to another station 110. If the recommendation is approved, a supervisor client device 112 may send an indication to the value stream management service 121 that the recommendation is approved.

The supervisor client devices 112 may be employed to perform 6S evaluations. These 6S evaluations ca may n each include a series of questions concerning the operating conditions of a station 110. The answers to the series of questions may be sent to the value stream management service 121 by the supervisor client device 112 that performed the 6S evaluation, and the value stream management service 121 may update the 6S data 151 accordingly.

The computing environment 103 may receive a stream of metrics 131 from the station computing devices (e.g., station client devices 109) that are each positioned at one of a plurality of stations 110 in a manufacturing process, where individual ones of the station computing devices include at least one sensor configured to generate metrics in the stream of metrics 131. The sensor may include a traditional I/O device, such as a keyboard and/or mouse, a camera, an object detection sensor, or other sensor. The value stream management service 121 may determine an optimal allocation of resources, such as personnel, for each of the stations 110 in the manufacturing process based at least in part on the metrics 131 in the stream of metrics 131 and display the optimal allocation of resources in at least one user interface.

Further, the value stream management service 121 may determine that a first cycle time of a first one of the stations exceeds a threshold based at least in part on an analysis of a first subset of the stream of metrics 131 corresponding to the first one of the stations 110a. The value stream management service 121 may also determine that a second cycle time of a second one of the stations 110b falls below a threshold based at least in part on an analysis of a second subset of the stream of metrics 131 corresponding to the second one of the stations 110b. In response to the cycle time for the second one of the stations falling below the threshold, the value stream management service 121 identify a plurality of entries in an assignment database corresponding to the second one of the stations; select at least one of the entries in the job assignment database (e.g., job assignment data 142 and/or cross-training data 145) based at least in part on a cross-training metric generated that corresponds to the at least one entry. The value stream management service 121 may send a notification to an administrator client device 106 that includes a recommended action for the second one of the stations 110b determined based at least in part on the at least one of the entries in the job assignment database.

Again, the metrics 131 in the stream of metrics 131 may include timestamp data received from the station computing devices (e.g., station client devices 109) at a predefined time interval. The value stream management service 121 may be further directed to determine the cycle time for the first one of the stations 110a based at least in part on at least one first station job-in event, where the at least one first station job-in event is extracted from the timestamp data 130; and determine the cycle time for the second one of the stations 110b based at least in part on at least one second station job-in event and at least one second station job-out event, where the at least one second station job-in event and the at least one second station job-out event are extracted from the timestamp data 130.

The at least one entry from the plurality of entries in the job assignment table may be selected based on a status of the second one of the stations and a status of at least one respective queue associated with the second one of the stations 110b. The value stream management service 121 may be further directed to determine a status of individual ones of the stations 110 based at least in part on the timestamp data 130, and determine a status of individual queues of a plurality of queues associated with the stations 110 based at least in part on the timestamp data 130.

In further embodiments, the value stream management service 121 may encode for rendering on a user interface an indication of a status of individual stations 110 of a plurality of stations 110, and encode for rendering on the user interface an indication of a status of individual queues of a plurality of queues associated with the stations 110. A recommended action may include transferring at least one individual corresponding to the at least one entry from the second one of the stations 110b to the first one of the stations 110a. The cross-training metric may include an indication that an individual is fully-trained, in-training, or untrained with respect to a process associated with the second one of the stations 110b.

Further, in some embodiments, the value stream management service 121 may access a timestamp dataset 127 from the data store 118, where the timestamp dataset 127 includes timestamp data 130 generated for a plurality of intervals over a period of time. The value stream management service 121 may determine an underperformance frequency for respective ones of the stations based at least in part on the timestamp data 130, where the underperformance frequency includes a frequency that a cycle time of the respective stations fell below the threshold over the period of time; and determine that a third one of the stations 110c has a highest underperformance frequency among the stations 110. The value stream management service 121 may be further directed to generate at least one user interface comprising a value stream map, and dynamically update the value stream map as updated metrics in the stream of metrics are received, as will be described in FIGS. 2A-2D.

Turning to FIGS. 2A-2D, examples of user interfaces are shown including a dynamic value stream map 200 generated over several predetermined intervals of time. The user interfaces including the dynamic value stream map 200 that may be rendered on the management console 122 or on any other suitable display as may be appreciated. In some embodiments, the user interfaces including the dynamic value stream map 200 may be rendered on a display 113 of a supervisor client device 112. The dynamic value stream map 200 of FIGS. 2A-2D may be employed for real-time process monitoring, constraint management, and adjusting resources to enable flow.

Figure 2A:
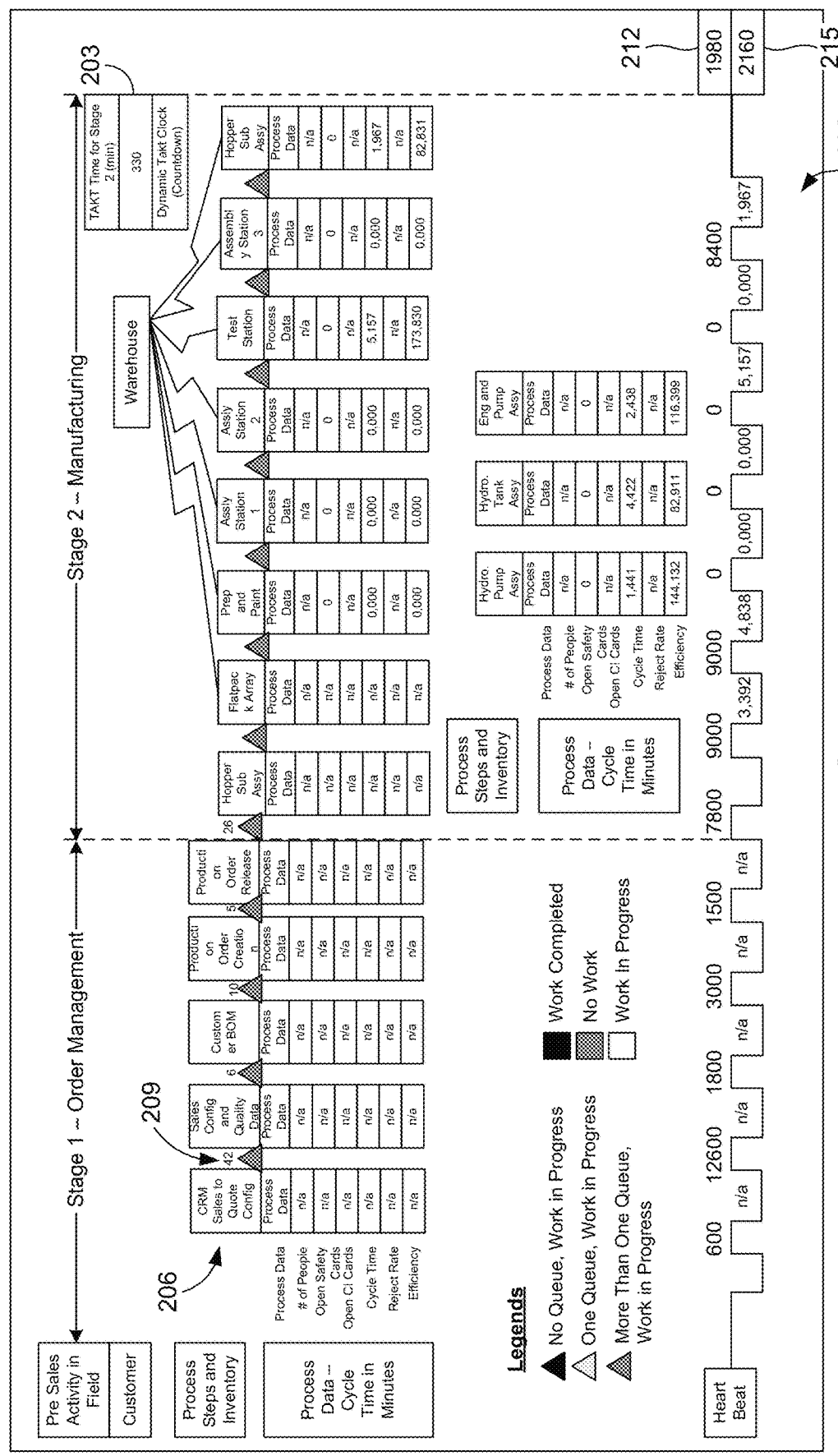
FIGS. 2A-2D show examples of user interfaces including dynamic value stream maps over a plurality of predetermined time intervals according to various embodiments.

Referring specifically to FIG. 2A, FIG. 2A shows an example of the dynamic value stream map 200 at an elapsed time of zero minutes, for instance, before work has begun. The dynamic value stream map 200 may include a takt time clock 203 counting down the takt time. The total takt time is three-hundred and thirty minutes, so the takt time clock 203 shows that 330 minutes remain in the takt time.

The dynamic value stream map 200 may include indications of one or more stations 206, which may represent the stations 110 associated with station client devices 109, as well as an indication of a status of each station 110. The dynamic value stream map 200 may also include indications of the total of the non-value-added time 212 and the value-added time 215.

The dynamic value stream map may include indications of one or more characteristics associated with each station 110. These characteristics may include a number of personnel assigned to a station 110, a number of open corrective action review board cards for the station 110, a number of open 6S cards for the station 110, a number of open continuous improvement cards for the station 110, a reject rate for the station 110, and an efficiency of the station 110, among other metrics. These characteristics may be generated and displayed based on metrics 131 as well as various data stored in the data store 118. For example, the number of open corrective action review board cards for a station 110 may be based on the corrective action data 148.

The dynamic value stream map 200 may include indications of one or more queues 209 that may be associated with the stations 206. Each of the queues 209 may include an indication of a number of items that are to be processed by the associated station once a current job has been completed.

The dynamic value stream map 200 may include a status of the queues 209, which may depend on a number of items in each queue 209.

Figure 2B:
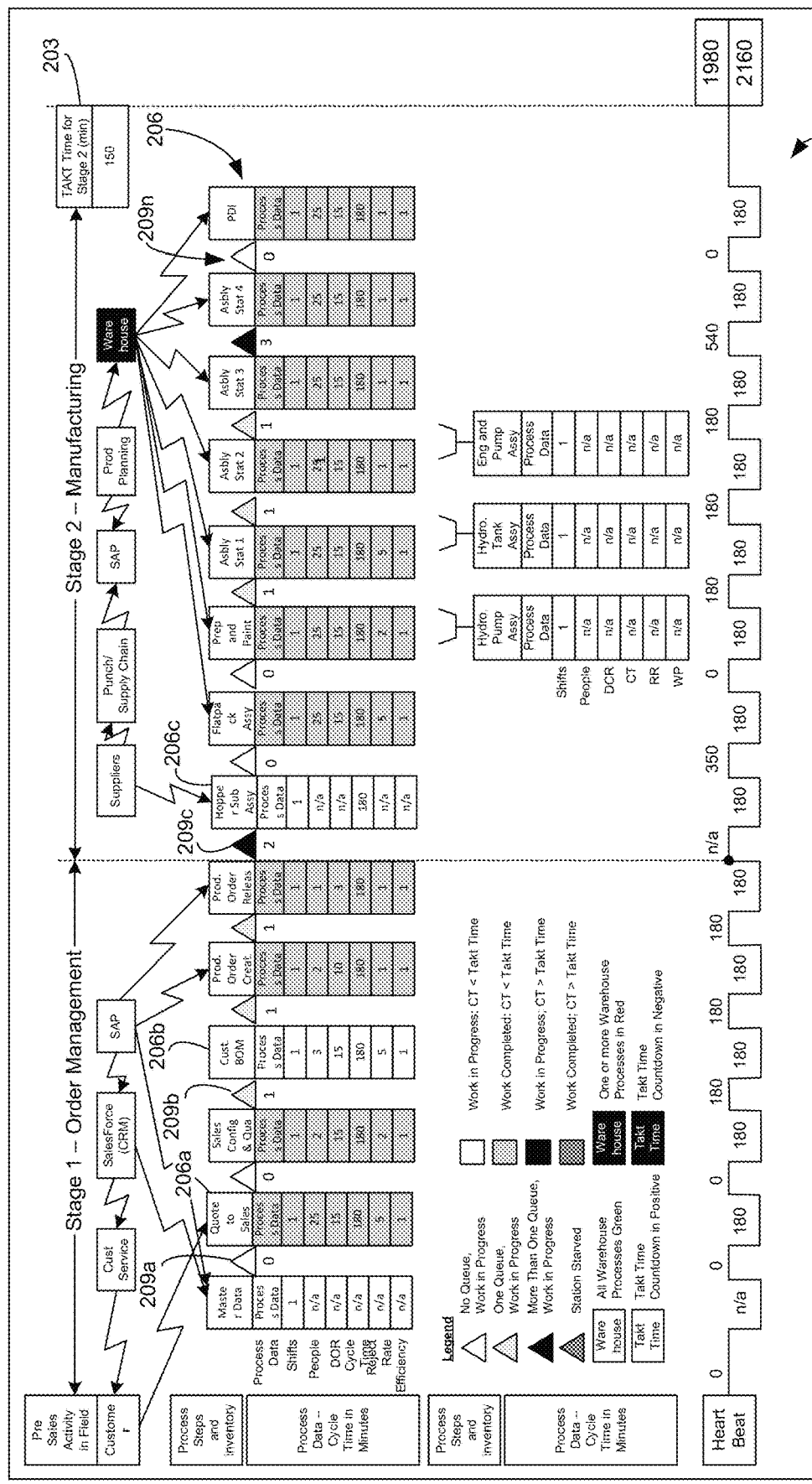

FIG. 2B shows an example of the dynamic value stream map 200 at an elapsed time of one-hundred and eighty minutes. The total takt time is three-hundred-and-thirty minutes, so the takt time clock 203 shows that one-hundred-and-thirty minutes remain in the takt time. The dynamic value stream map 200 may therefore include an indication that the elapsed time is less than the total takt time.

At station 206a, a job is in progress and there are no items in the associated queue 209a. The cycle time of station 206a shows that one-hundred and eighty minutes have elapsed. The dynamic value stream map 200 may include an indication that station 206a has a status of "on track" and that queue 209a has a status of "empty." At station 206b, a job has been completed. The job was completed at one-hundred and eighty minutes, which becomes the cycle time. There are no items in the queue associated with station 206b. The dynamic value stream map 200 may include an indication that station 206b has a status of "ahead" and that queue 209b has a status of "normal." At station 206c, a job is in progress and there is more than one item in the queue 209c. The dynamic value stream map 200 may include an indication that queue 209c has a status of "overloaded."

Figure 2C:
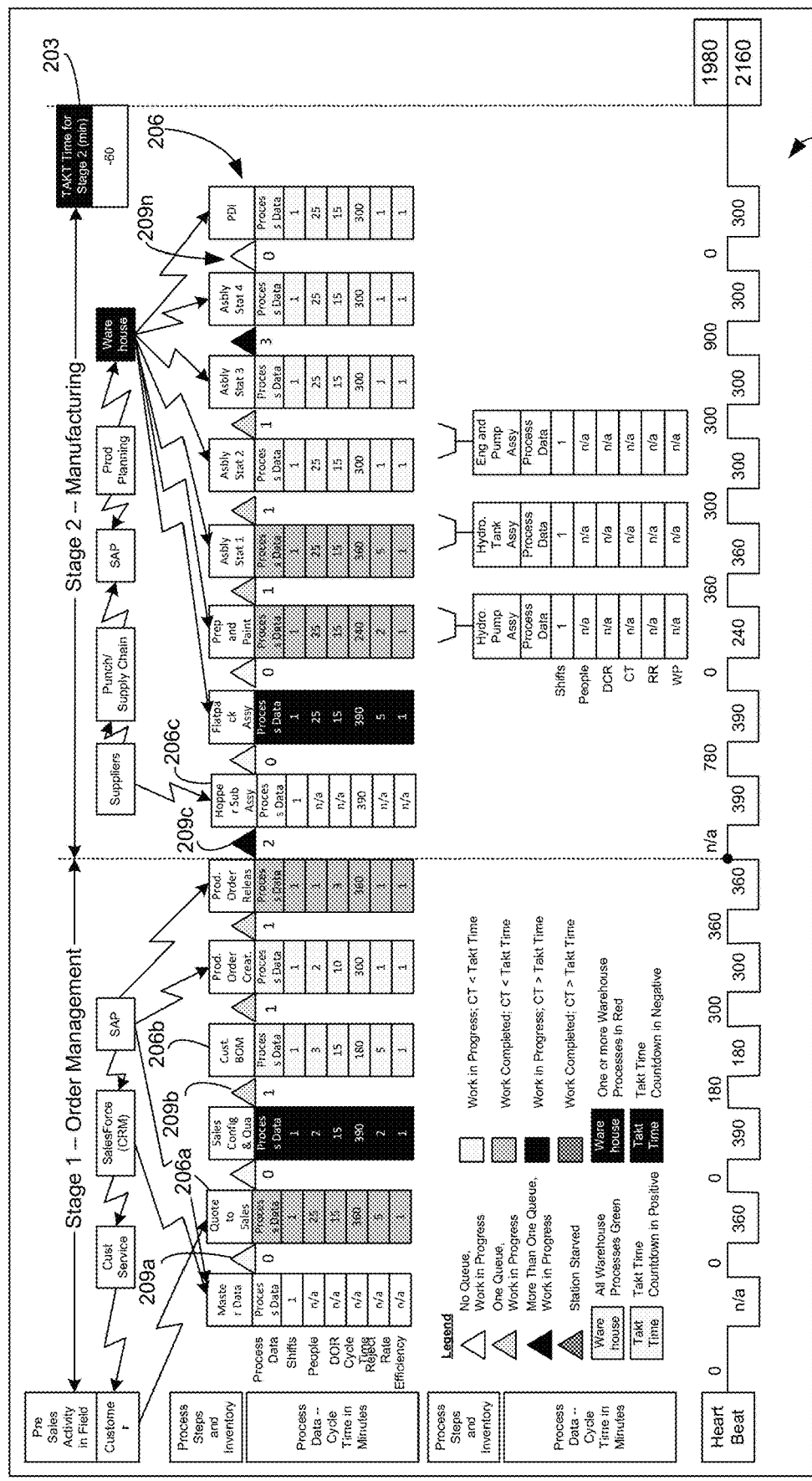

FIG. 2C shows an example of the dynamic value stream map 200 at an elapsed time of three-hundred and sixty minutes. The total takt time is three-hundred and thirty minutes, so the takt time clock 203 shows a takt time of negative thirty (−30). The dynamic value stream map 200 may therefore include an indication that the elapsed time exceeds the total takt time. At station 206a, the job is complete. The job at station 206a was completed at three-hundred and thirty minutes, which became the cycle time. The dynamic value stream map 200 may include an indication that station 206a has a status of "ahead" and that queue 209a has a status of "empty." At station 206b, the job was completed at one-hundred and eighty minutes, so there is no change in the status of station 206b. At station 206c, the job is still in progress even thirty minutes after the takt time, and more than one item is in the queue 209c. The dynamic value stream map 200 may include an indication that station 206c has a status of "behind" and that queue 209c has a status of "overloaded."

Figure 2D:
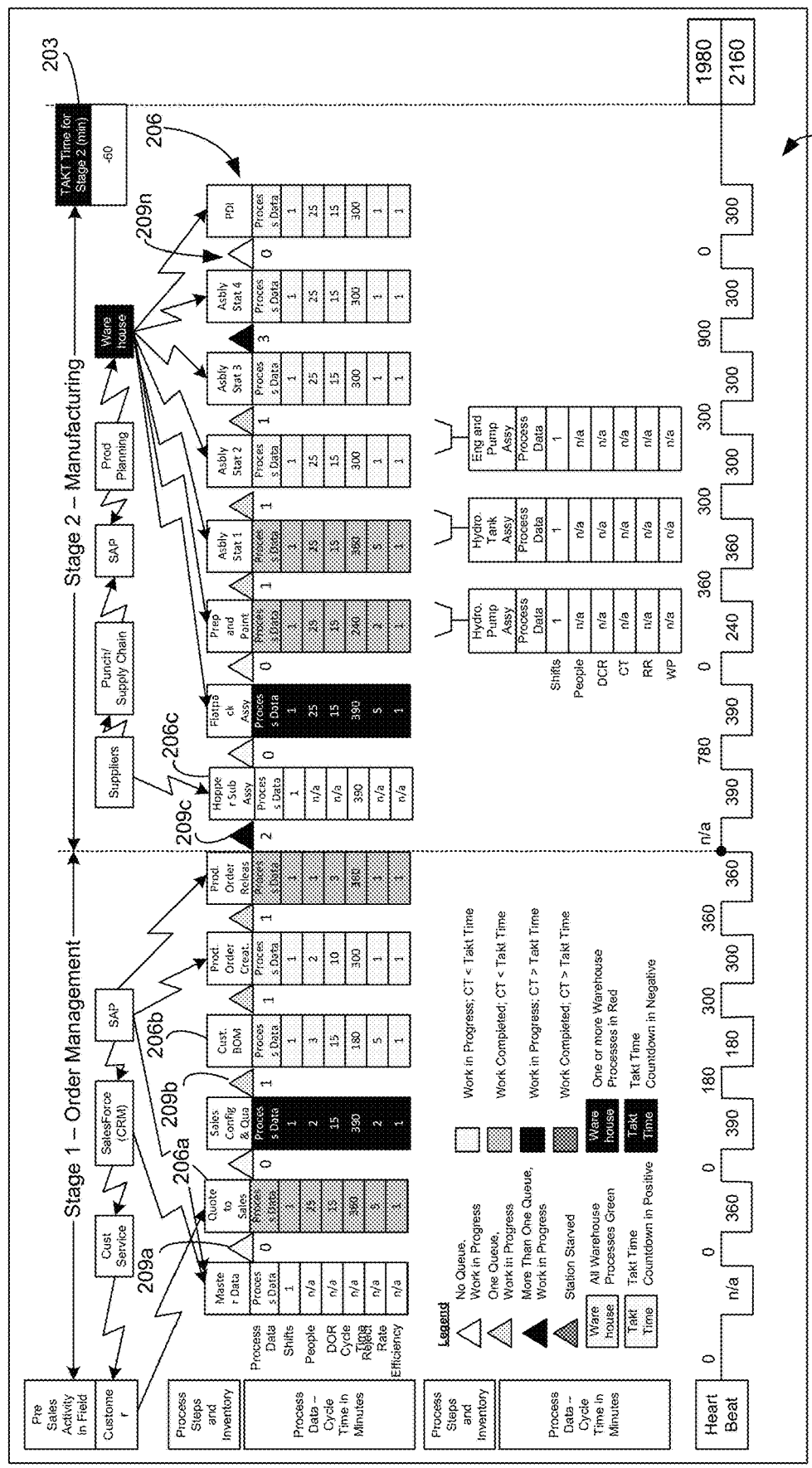

FIG. 2D shows an example of the dynamic value stream map 200 at an elapsed time of 390 minutes. The total takt time is three-hundred and thirty minutes, so the takt time clock 203 shows a takt time of negative sixty (−60). The dynamic value stream map 200 may therefore include an indication that the elapsed time exceeds the takt time. At station 206a, there is no item available for the queue 209a. At station 206c, the job was completed at three-hundred and sixty minutes, which is greater than the takt time of three-hundred and thirty minutes. The dynamic value stream map 200 may include an indication that the station 206c has a status of "late" and that the queue 209c has a status of "starved."

Figure 3:
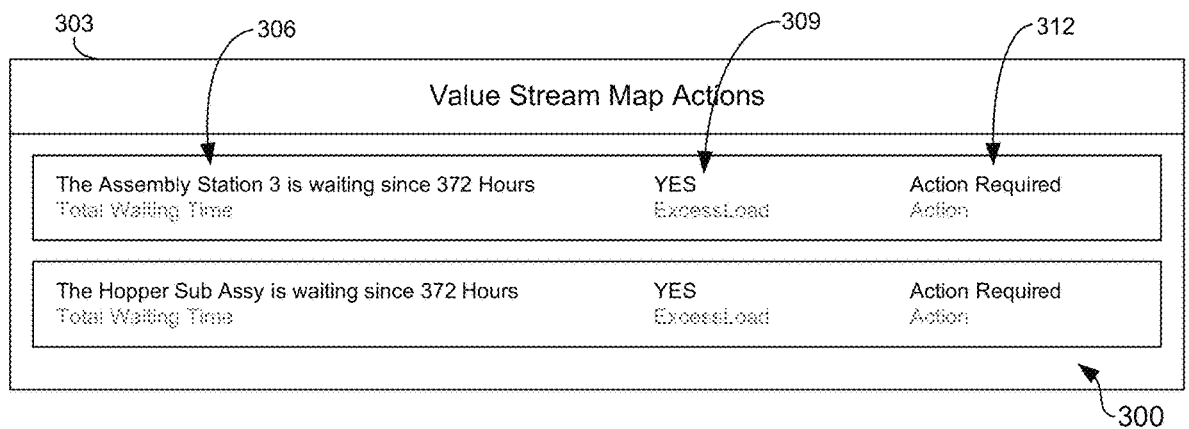
FIG. 3 shows an example of a user interface including an action notification specification according to various embodiments.

Turning to FIG. 3, shown is an example of a user interface including an action notification 300. The user interface including the action notification 300 may be rendered on the management console 122 or on any other suitable display as may be appreciated. In some embodiments, the user interface including the action notification 300 may be rendered on a display 113 of a supervisor client device 112.

The action notification 300 may be sent by the notification service 124 based on a command from the value stream management service 121. The action notification may include a list 303 of stations 110 for which some action is required or recommended. A station wait-time message 306 may display amount of time by which a station 110 is behind. A queue status message 309 may include an indication that a queue associated with a station 110 either is either "overloaded" or is "starved." An action required message 312 may include an indication that action is required or recommended for a station 110 and a recommended action for the station 110.

Figure 4:
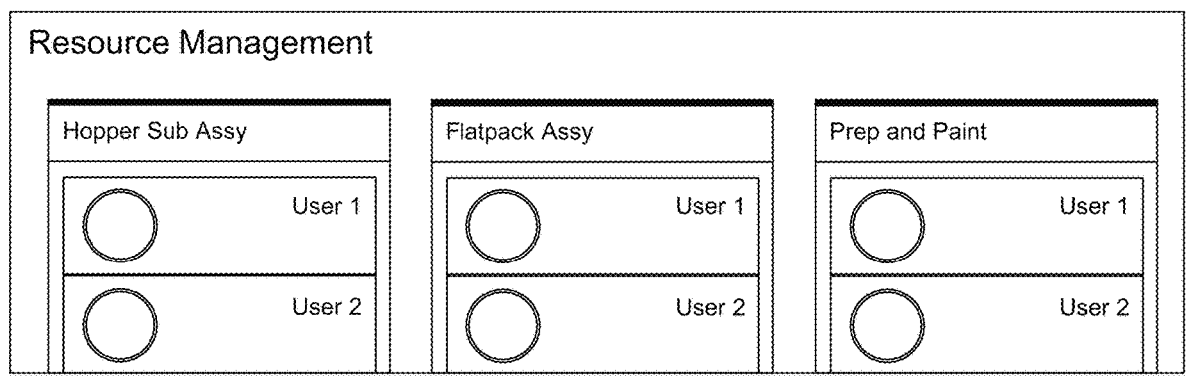
FIG. 4 shows an example of a user interface including a job assignment table according to various embodiments.

Turning to FIG. 4, an example of a user interface including a job assignment table 400 is shown. The user interface including the job assignment table 400 may be rendered on the management console 122 or on any other suitable display as may be appreciated. In some embodiments, the user interface including the job assignment table 400 may be rendered on a display 113 of a supervisor client device 112. The job assignment table 400 may display the job assignment data 142 in a graphical form. The job assignment table 400 provides a view of which personnel are currently assigned to which stations 110. The job assignment table 400 may be employed to assign one or more individuals to a station 110. The job assignment table 400 c may an also be used to reassign one or more individuals from one station 110 to a different station 110. When an assignment of an individual is added, modified, or otherwise changed, the job assignment data 142 may be updated accordingly.

Turning to FIG. 5, an example of a user interface including a cross-training matrix 500 is shown in accordance with various embodiments. The user interface including the cross-training matrix 500 may be rendered on the management console 122 or on any other suitable display as may be appreciated. In some embodiments, the user interface including the cross-training matrix 500 may be rendered on a display 113 of a supervisor client device 112. The cross-training matrix 500 may display cross-training data 145 in a graphical form, which may include cross-training metrics assigned or generated programmatically for individual personnel.

The cross-training matrix 500 may be employed to filter the cross-training data 145 by location, value stream, department, process step, or other criteria as may be appreciated. The cross-training matrix 500 may be employed to track what individuals are qualified to work at each station 110. For each individual in the cross-training matrix 500, the cross-training matrix 500 may display a training value associated with each job in a process. As such, the cross-training matrix 500 may be employed to maintain a flexible workforce. The cross-training matrix 500 may display various cross-training metrics, such as a station flexibility score 505 and an individual flexibility score (not shown), also referred to as a personnel flexibility score. In some embodiments, the station flexibility score 505 and/or the individual flexibility score are determined programmatically by the value stream management service 121 as a function of past performance metrics.

In some embodiments, the cross-training matrix 500 is automatically created as a hierarchy of users or personnel are created. Generally, the cross-training matrix 500 tracks who is qualified to work at what stations 110. As such, the cross-training matrix 500 provide various back-end algorithms and value stream teams the knowledge of the right candidates to re-allocate for managing constraints. It is understood that it is a goal of the value stream team to increase the flexibility of each worker and each process step. As such, the value stream management service 121 may generate and provide recommendations regarding how to increase the flexibility of a value stream.

Figure 6A:
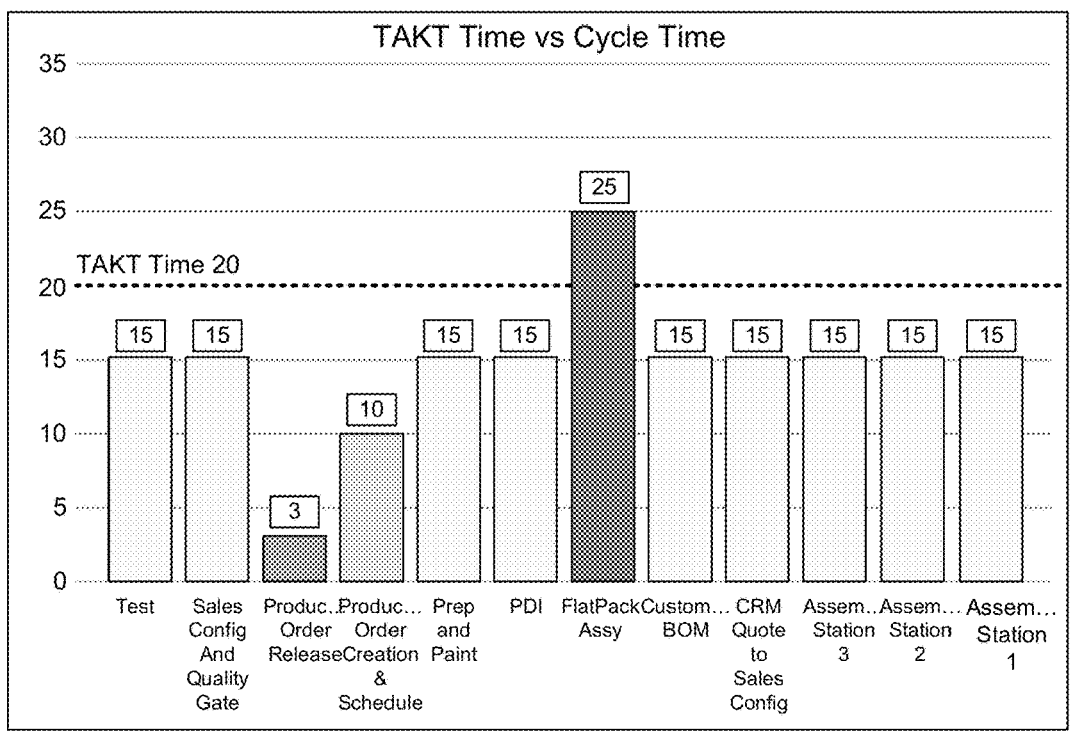
FIGS. 6A and 6B show examples of user interfaces including data visualizations for process stations according to various embodiments.
Figure 6B:
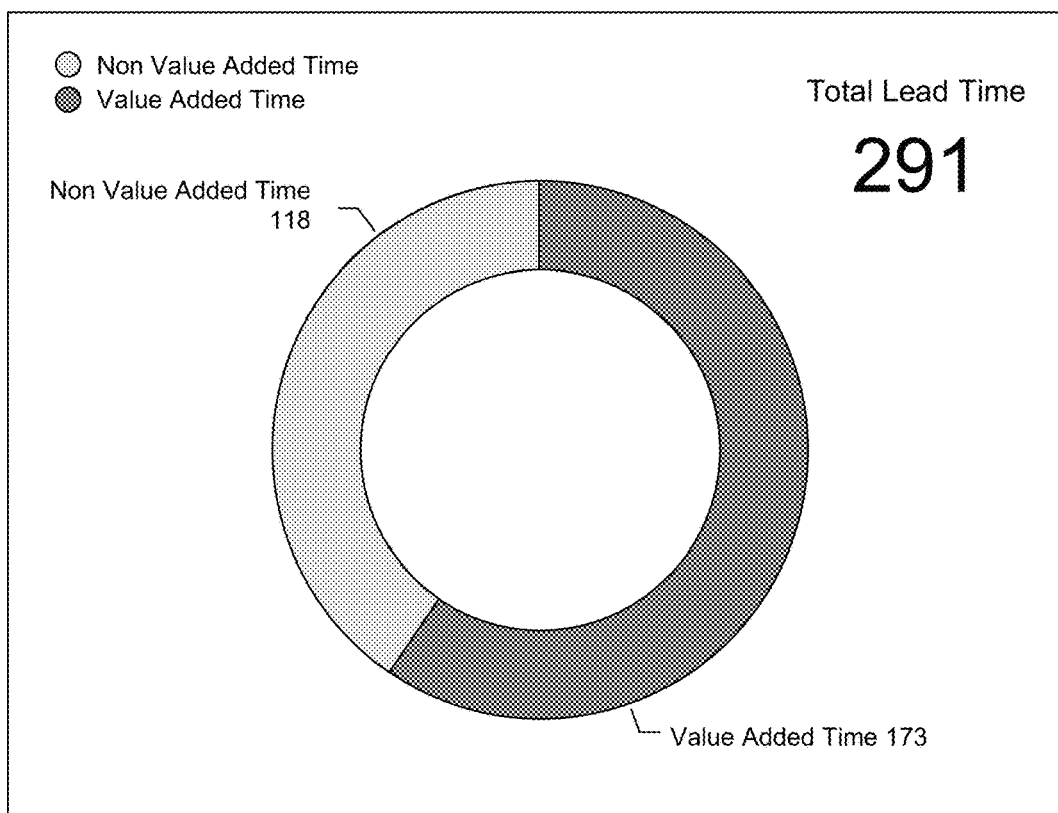

Turning to FIGS. 6A and 6B, shown are examples of user interfaces including data visualizations generated for example stations 110. The user interfaces including the data visualizations for the stations 110 may be rendered on the management console 122 or on any other suitable display as may be appreciated. In some embodiments, the user interfaces including the data visualizations for the stations 110 may be rendered on a display 113 of a supervisor client device 112.

Referring first to FIG. 6A, a user interface is shown that depicts a takt time versus a cycle time graph for one or more stations 110. In the example of FIG. 6A, a histogram is depicted, but other suitable graphs or other visualizations may be employed instead of or in addition to the histogram as may be appreciated. In the histogram, the takt time is equal to twenty and an indication is rendered on the graph that a station has a cycle time greater than twenty. In some embodiments, the average cycle time for each of the one or more stations 110 during a particular period of time may be employed. In some embodiments, the current cycle time for each of the one or more stations 110 may also be used.

Referring now to FIG. 6B, FIG. 6B shows a user interface including a graph comparing a value-added time with a non-value-added time during a particular period of time. An indication of a sum of the value-added time and the non-value-added time may be rendered along with a caption reading "total lead time," or other suitable caption as may be appreciated.

Figure 7:
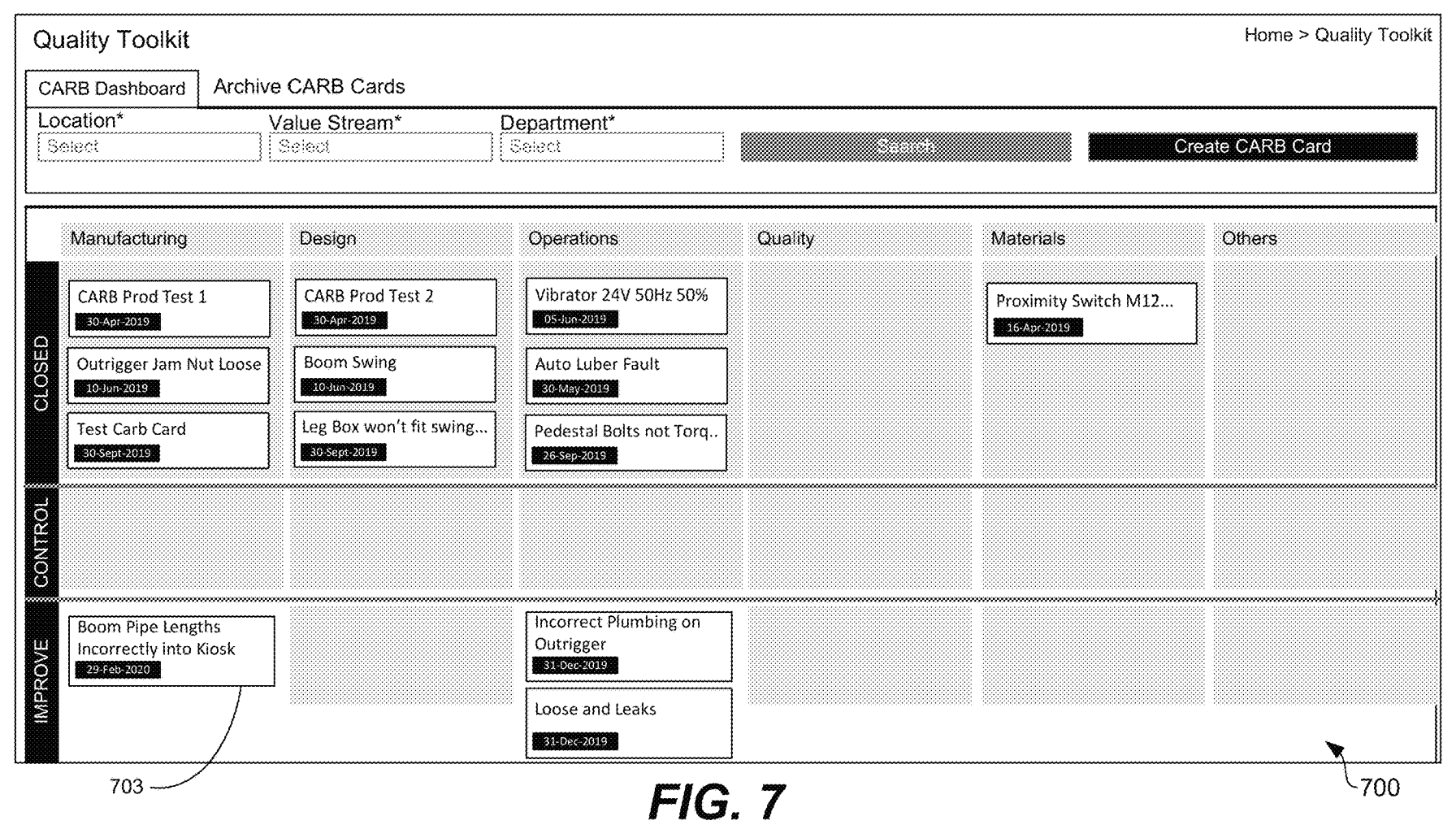

Turning to FIG. 7, an example of a user interface is shown that includes a corrective action review dashboard 700. The user interface including the corrective action review dashboard 700 may be rendered on the management console 122 or on any other suitable display as may be appreciated. In some embodiments, the user interface including the corrective action review dashboard 700 may be rendered on a display 113 of a supervisor client device 112. The corrective action review dashboard 700 may include a number of corrective action review board cards 703. A corrective action review board card 703 may include corrective action data 148 concerning one or more stations 110 for which a constraint has been identified.

For instance, the correction action review board cards 703, also referred to as carb cards, may take an administrator through a five-step root cause corrective action closure process to properly address defects. The correction action review board cards 703 may be managed using a digital workflow systems, where the system has escalation and metric creation functionality.

The corrective action review board cards 703 may be organized into one of several categories in the corrective action review dashboard 700. Examples of such categories include define, measure, analyze, improve, control, closed, and other categories as may be appreciated. A corrective action review board card 703 may be assigned to a category based on a status of the corrective action review board card 703. When the status of the corrective action review board card 703 changes, the corrective action review board card 703 may be assigned to a different category accordingly.

Figure 8:
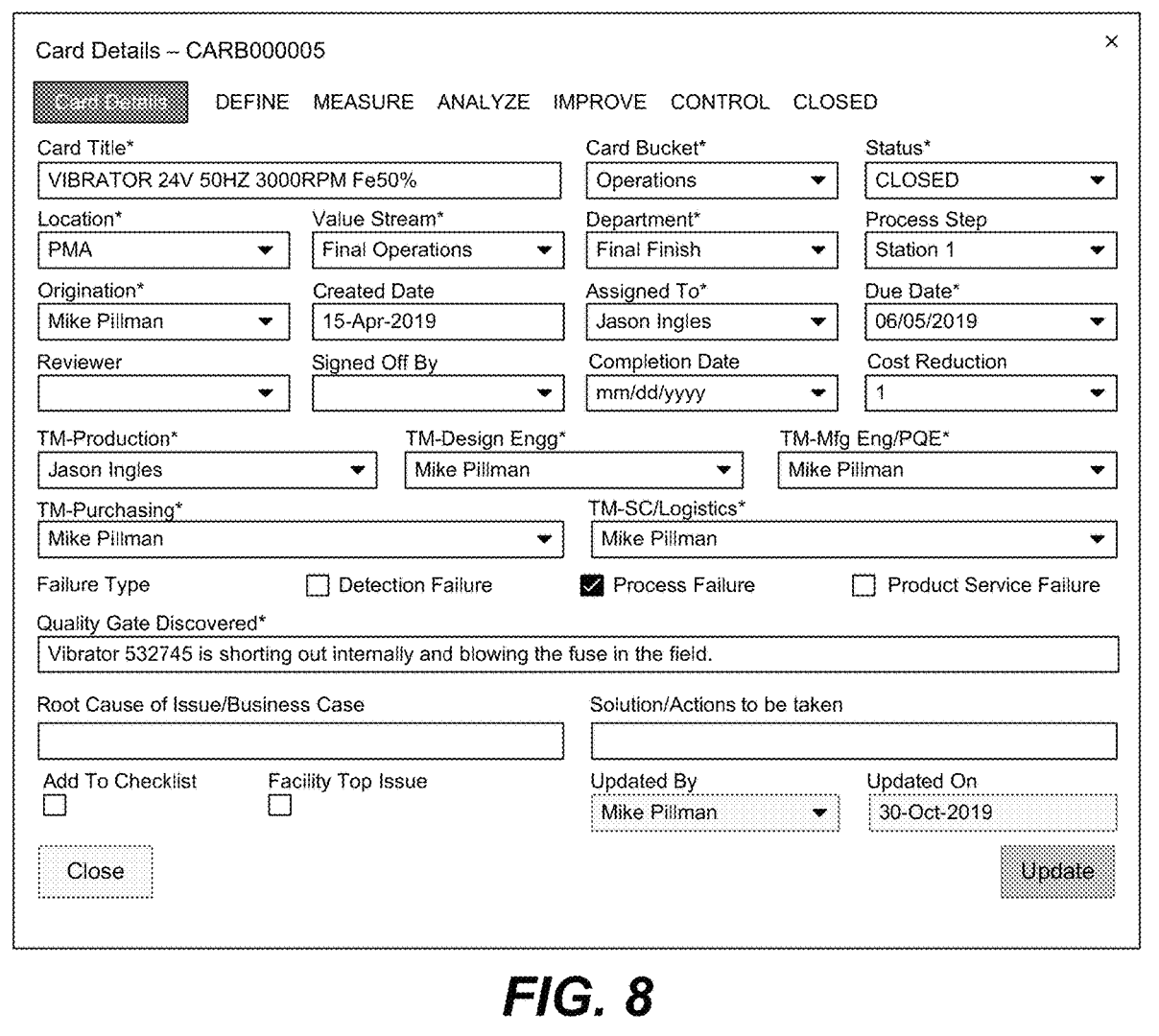

Turning to FIGS. 8 and 9, shown are examples of user interfaces that may be employed to generate and view corrective action data 148 for a corrective action review board card 703. The user interfaces may be rendered on the management console 122 or on any other suitable display as may be appreciated. In some embodiments, the user interfaces may be rendered on a display 113 of a supervisor client device 112. The user interfaces may be accessed from the corrective action review dashboard 700. The user interfaces may include one or more data fields. The corrective action data 148 for a corrective action review board card 703 may be populated into the one or more data fields when the corrective action review board card 703 is created or modified. When a corrective action review board card 703 is created or modified, the corrective action data 148 may be updated accordingly.

In some embodiments, there may be one or more such user interfaces for a particular corrective action review board card 703. Each of these user interfaces may include different types or categories of the corrective action data 148. For example, FIG. 8 shows a user interface that includes data about a station 110 for which a constraint has been identified and basic data about the constraint. As another example, FIG. 9 shows a user interface that includes data defining the constraint. Other user interfaces may be used for generating and viewing corrective action data 148 for a corrective action review board card 703 as may be appreciated.

Figure 10:
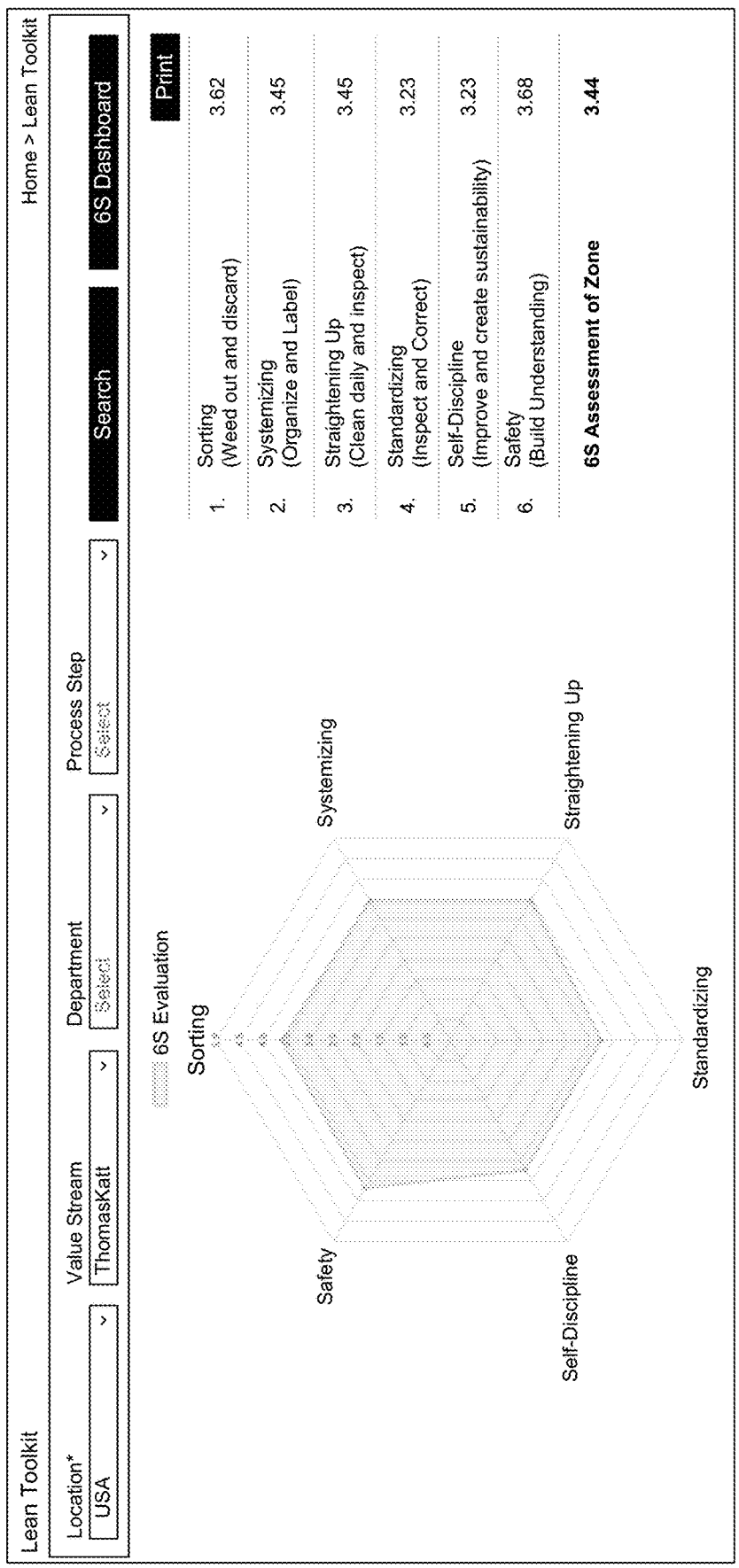
FIG. 10 shows an example of a user interface including results of a six-sigma (6S) evaluation according to various embodiments.

Turning to FIG. 10, an example of a user interface is shown including results of a 6S evaluation. The user interface including the results of a 6S evaluation may be rendered on the management console 122 or on any other suitable display as may be appreciated. In some embodiments, the user interface including the results of a 6S evaluation may be rendered on a display 113 of a supervisor client device 112. A 6S card may be opened based on the results of a 6S evaluation.

Turning to FIG. 11, shown is an example of a user interface that may be employed to generate data for a 6S evaluation. The user interface may be rendered on the management console 122 or on any other suitable display as may be appreciated. In some embodiments, the user interface may be rendered on a display 113 of a supervisor client device 112. The user interface may include a series of questions that are organized into at least one of several categories. Examples of such categories are sorting, systemizing, straightening up, standardizing, self-discipline, safety, and other categories as may be appreciated. The answers to the 6S questions may be provided to the value stream management service 121, and the value stream management service 121 may update the 6S data 151 accordingly, and may generate metrics for various individuals, processes, and other categories.

Using the user interfaces of FIGS. 10 and 11, a 6S audit may be performed that includes creating a client specific audit form in the configurator. Audits can be performed at any frequency the client required. 6S scores may be aggregated at a process step, value stream, or location level. 6S audit compliance and program overview may be managed on the 6S dashboard shown in FIG. 10, which may track team members to ensure they are administering audits at a predetermined frequency. Audit results can easily be drilled into. The overall progression of audit results for each process step may be tracked.

Turning to FIG. 12, shown is an example of a user interface that may be employed to generate 6S data 151 to create a new a 6S card. The user interface may be rendered on the management console 122 or on any other suitable display as may be appreciated. In some embodiments, the user interface may be rendered on a display 113 of a supervisor client device 112. The user interface may include one or more data fields. The 6S data 151 for a 6S card may be populated into the one or more data fields when a new 6S card is created. When a new 6S card is created, the 6S data 151 may be updated accordingly.

Figure 13:
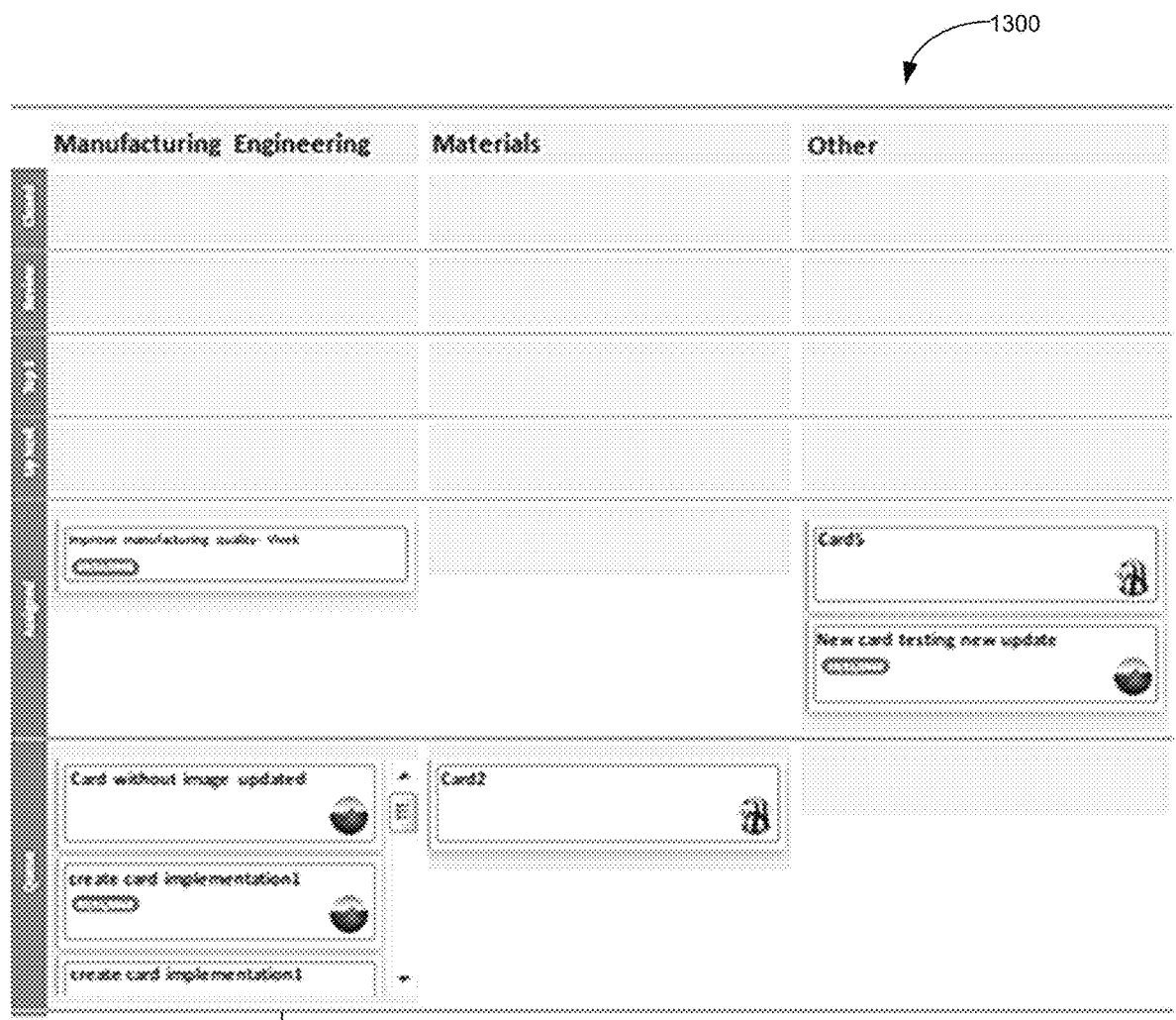
FIG. 13 shows an example of a user interface including a continuous improvement dashboard according to various embodiments.

Turning to FIG. 13, shown is an example of a user interface including a continuous improvement dashboard 1300. The user interface including the continuous improvement dashboard 1300 may be rendered on the management console 122 or on any other suitable display as may be appreciated. In some embodiments, the user interface including the continuous improvement dashboard 1300 may be rendered on a display 113 of a supervisor client device 112. The continuous improvement dashboard 1300 may include a number of continuous improvement cards 1303. The continuous improvement cards 1303 may include continuous improvement data 154 concerning one or more stations 110 for which a continuous improvement item has been identified.

The continuous improvement cards 1303 may be organized into one of several categories on the continuous improvement dashboard 1300. Examples of such categories are new, past due, queue, assigned, up next, top 5, review, closed, and other categories as may be appreciated. A continuous improvement card 1303 may be assigned to a category based on a status of the continuous improvement card 1303. For example, a newly-created continuous improvement card 1303 may be assigned to the New category. A continuous improvement card 1303 may transition from one category to another based on a change in a status of the continuous improvement card 1303. For example, once a review of a continuous improvement card 1303 is completed, the continuous improvement card 1303 may transition from the review category to the closed category.

Figure 14:
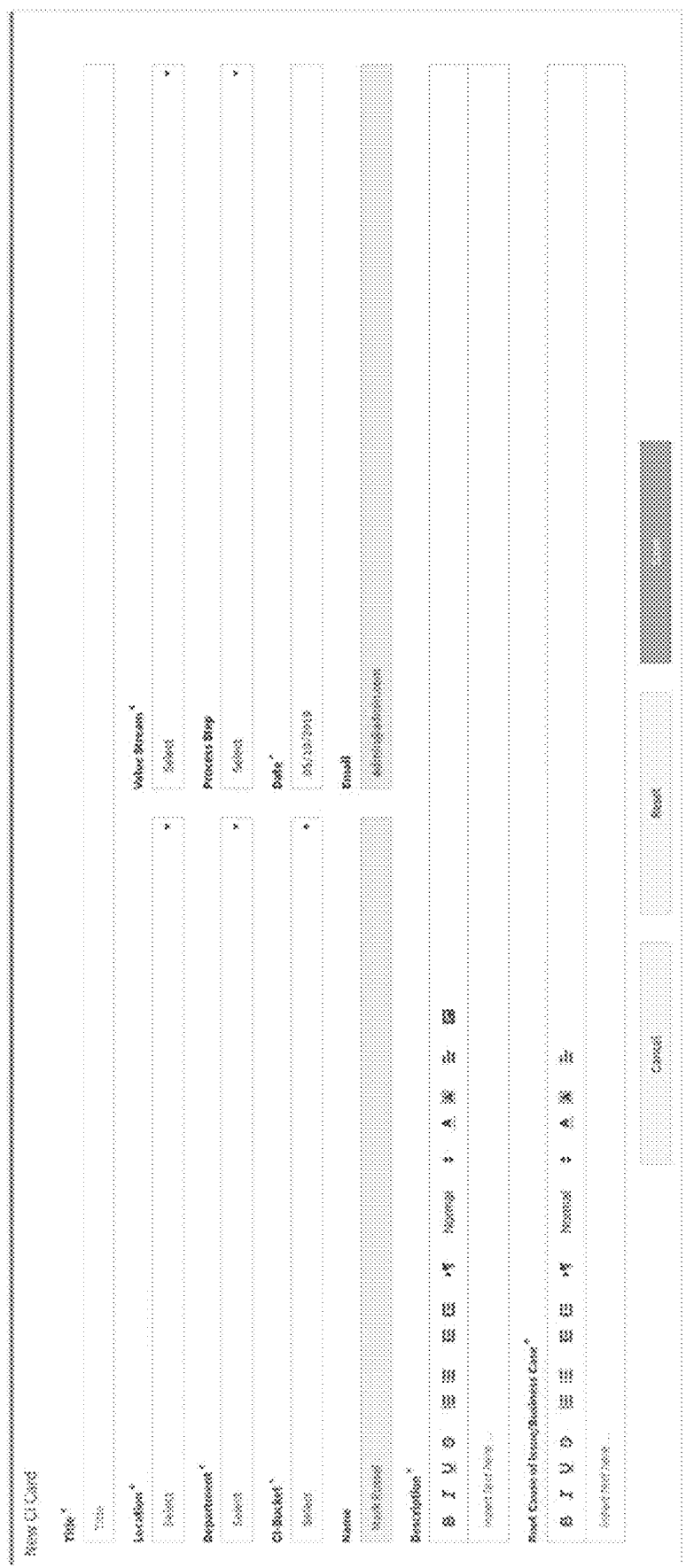
FIG. 14 shows an example of user interface that may be employed to generate continuous improvement data to create a new continuous improvement card according to various embodiments.

Turning to FIG. 14, shown is an example of a user interface that may be employed to generate continuous improvement data 154 to create a new continuous improvement card 1303. The user interface may be rendered on the management console 122 or on any other suitable display as may be appreciated. In some embodiments, the user interface may be rendered on a display 113 of a supervisor client device 112. The user interface may include one or more data fields. The data for a continuous improvement card 1303 may be populated into the one or more data fields when a new continuous improvement card 1303 is created. When a new continuous improvement card 1303 is created, the continuous improvement data 154 may be updated accordingly.

Figure 15:
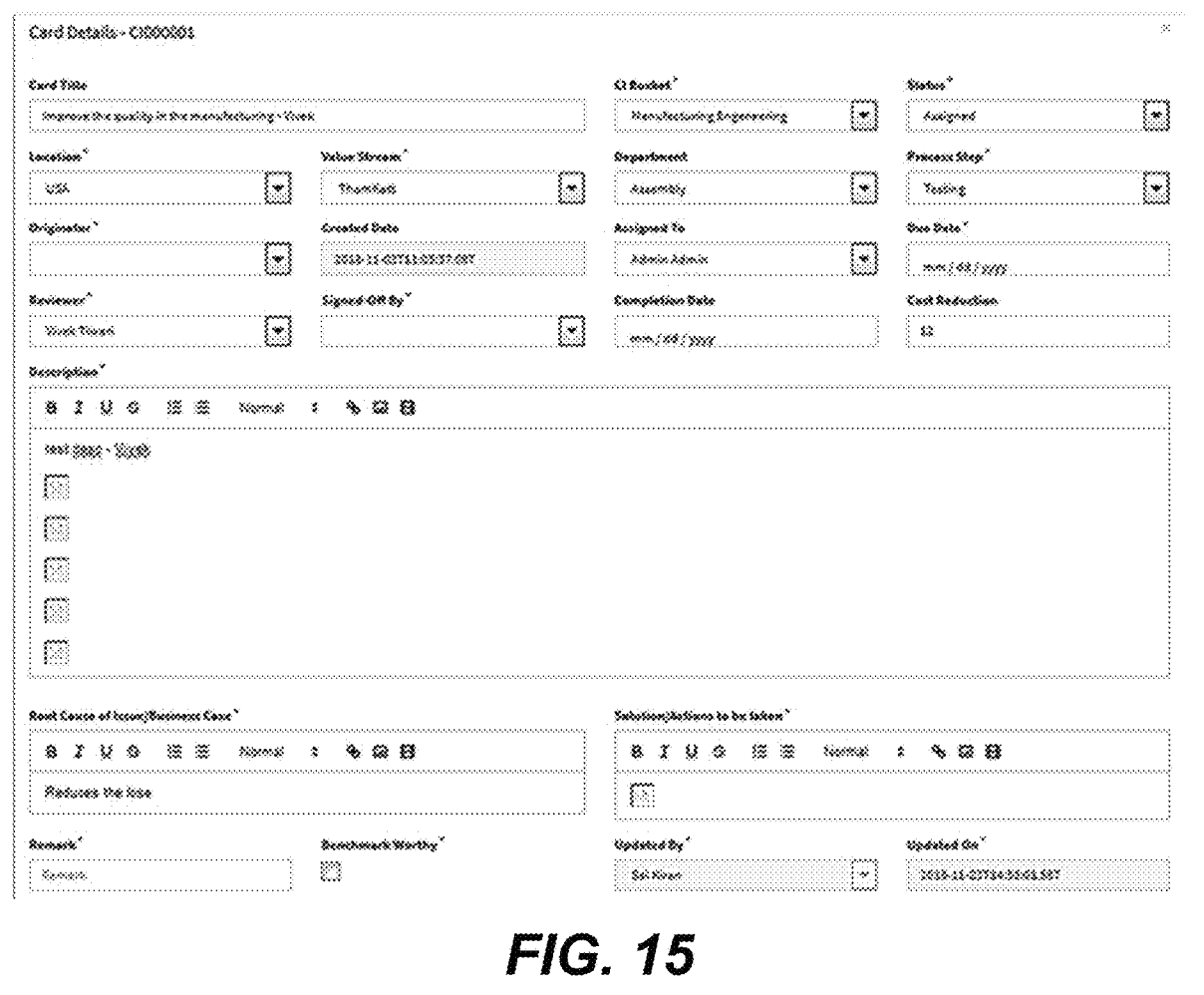

Turning to FIG. 15, shown is an example of a user interface that may be employed to generate and view continuous improvement data 154 for a continuous improvement card 1303. The user interface may be rendered on the management console 122 or on any other suitable display as may be appreciated. In some embodiments, the user interface may be rendered on a display 113 of a supervisor client device 112. The user interface may include one or more data fields. The data for a continuous improvement card 1303 may be populated into the one or more data fields when a continuous improvement card 1303 is created or modified. When a continuous improvement card 1303 is modified, the continuous improvement data 154 may be updated accordingly.

Referring next to FIGS. 16 and 17, examples of a user interface for a manufacturing toolkit are shown that may be employed to analyze various metrics for various stations in a manufacturing process according to various embodiments.

Specifically, FIG. 16 may include a dashboard where an administrator may analyze an overview generated for a value stream dashboard. Through the value stream dashboard, an administrator may be able to perform constraint management, as may be appreciated. For instance, the user interface of FIG. 16 may provide real time data of performance for each process step in an operation. In some embodiments, an administrator may select or otherwise manipulate "refresh index" at the end of a cycle, which may begin a new cycle and create a "start" timestamp. A takt time clock 605 will re-start and a countdown clock 610 may be provided to give an indication how long each station has to complete their task. With respect to the takt time clock 605, once the countdown reaches zero, the clock may start counting up and turns red or other suitable color, which indicates how much extra time a cycle is taking in excess of the allotted time. An index 615 is shown where the index denotes a unique cycle.

The user interface of FIG. 16 includes a plurality of process cards 620a . . . 620n (collectively "process cards 620") for a manufacturing process or other task having individual processes required for completion. For instance, a first process may include "fit frame," a second process may include "put wheels," a third process may include "wiring and electrical," a fourth process may include "sensors and boards," a fifth process may include "paint," a sixth process may include "polish," a seventh process may include "quality test," an eighth process may include "test ride," and so forth. Each process card 620 may include information for a corresponding process, such as a unique process identifier number, number of individuals assigned to the process, open 6S card, open CI cards, cycle time, reject rate, efficiency, as well as other information. In some embodiments, the process cards 620 are shown in the user interface in accordance with an order of operation. As shown in FIG. 17, a delta 625 may be shown in association with each process card 620. The delta 625 may be selected or otherwise manipulated to change the schedule and update the sequence of jobs that will be moved into process as the next refresh index is selected.

Referring again to FIG. 16, a step wave 630 is shown that is referred to as a "value stream heartbeat" in the related filed. An upper part of the step wave 630 may correspond to a non-value added time in the system, whereas a lower part of the step wave 630 is the value added time. The value added time and non-value added time may be summed to calculate a total lead-time of a value stream. For instance, the total lead-time may include a time to schedule production order and estimate a finish date of each order. This is important to provide in real-time as it permits personnel to obtain a most up-to-date understanding of how customer delivery dates will change as constrains grow or reduce. If constraints grow, the schedule will be pushed out. The routines and algorithms described herein may be employed to re-allocate personnel addressing the constrains, reducing the total lead-time, and ensuring on time delivery of orders.

Turning now to FIG. 18, an example of a user interface is shown for specifying an internal defect according to various embodiments. Specifically, FIG. 18 shows a user interface for an administrator portal, or for another operator. The user interface of FIG. 18 may be used by an administrator or other individual to enter or create detected, access a checklist by sending a message, manage andon calls, which will call for help and track downtime, as well as other functions. The user interface of FIG. 18 may provide andon downtime tracking, which may be used to update the value, non-value tracking, and analytics. As such, the value stream management service 121 may assist an administrator to better understand where productive hours are being lost and provide continuous improvement recommendations.

Further, the user interface of FIG. 18 may provide process instructions that are accessible for the tasks needed to be complete in a given process step (e.g., for a process card 620). Also, the user interface of FIG. 18 may be employed by an administrator to create a finish timestamp when complete with a job, which may be used for CT/TT analytics, understanding ongoing constraints, and tracking value stream performance.

Figure 19:
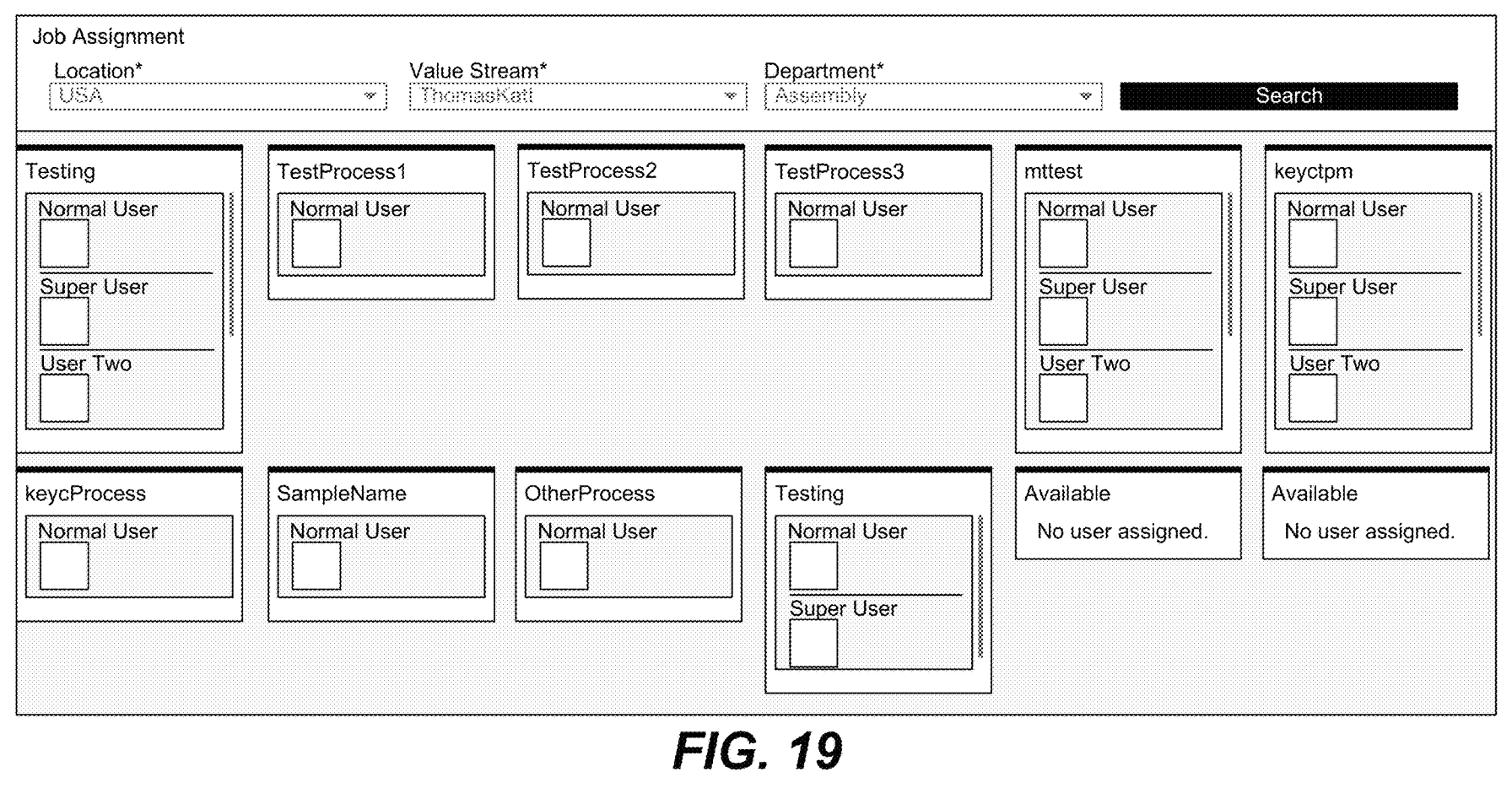

Referring now to FIG. 19, an example of a user interface is shown for assigning personnel to various processes and/or stations according to various embodiments. Specifically, the user interface of FIG. 19 may include a job assignment or a resource management user interface that is automatically created and updated as a hierarchy of users are created. In some embodiments, an administrator may drag and drop personnel into necessary process steps at an end of shift or at another desirable time. This function automatically updates the number of people in the constraint management dashboard. As process step are complete in constraint management, the value stream management service 121 will run to detect constraints, review the current state of the value stream, reference the cross training matrix, and re-allocate people as needed. Notifications may be sent to recipients as manpower reallocations or personnel reallocations are needed.

Figure 20:
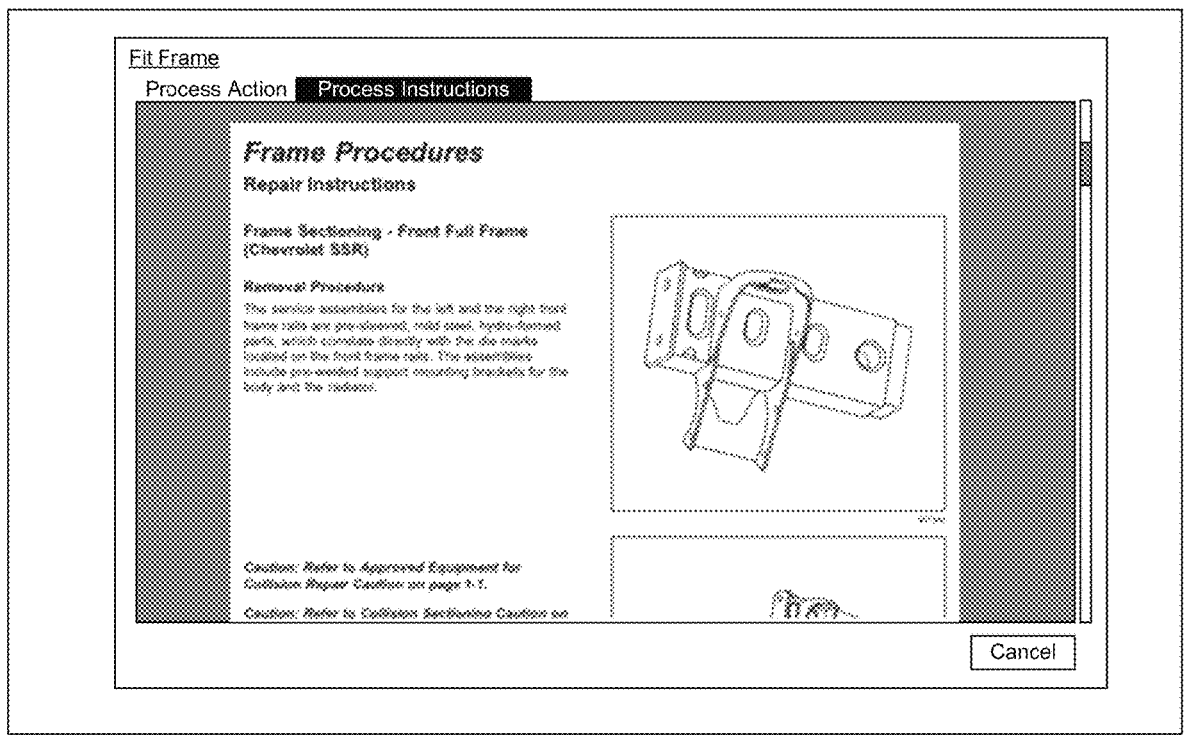
FIG. 20 is an example of a user interface for assisting with an assembly task of a process according to various embodiments.

Referring next to FIG. 20, an example of a user interface is shown for assisting with an assembly task of a process according to various embodiments. FIG. 20 may include a user interface shown in a display of a station computing device (e.g., station client device 109). As such, the user interface may include process instructions that can be used by an operator working on a process or process step. In some embodiments, the station client device 109 may play or display audio and/or visual data that assists the operator in completing a process or task.

Figure 21:
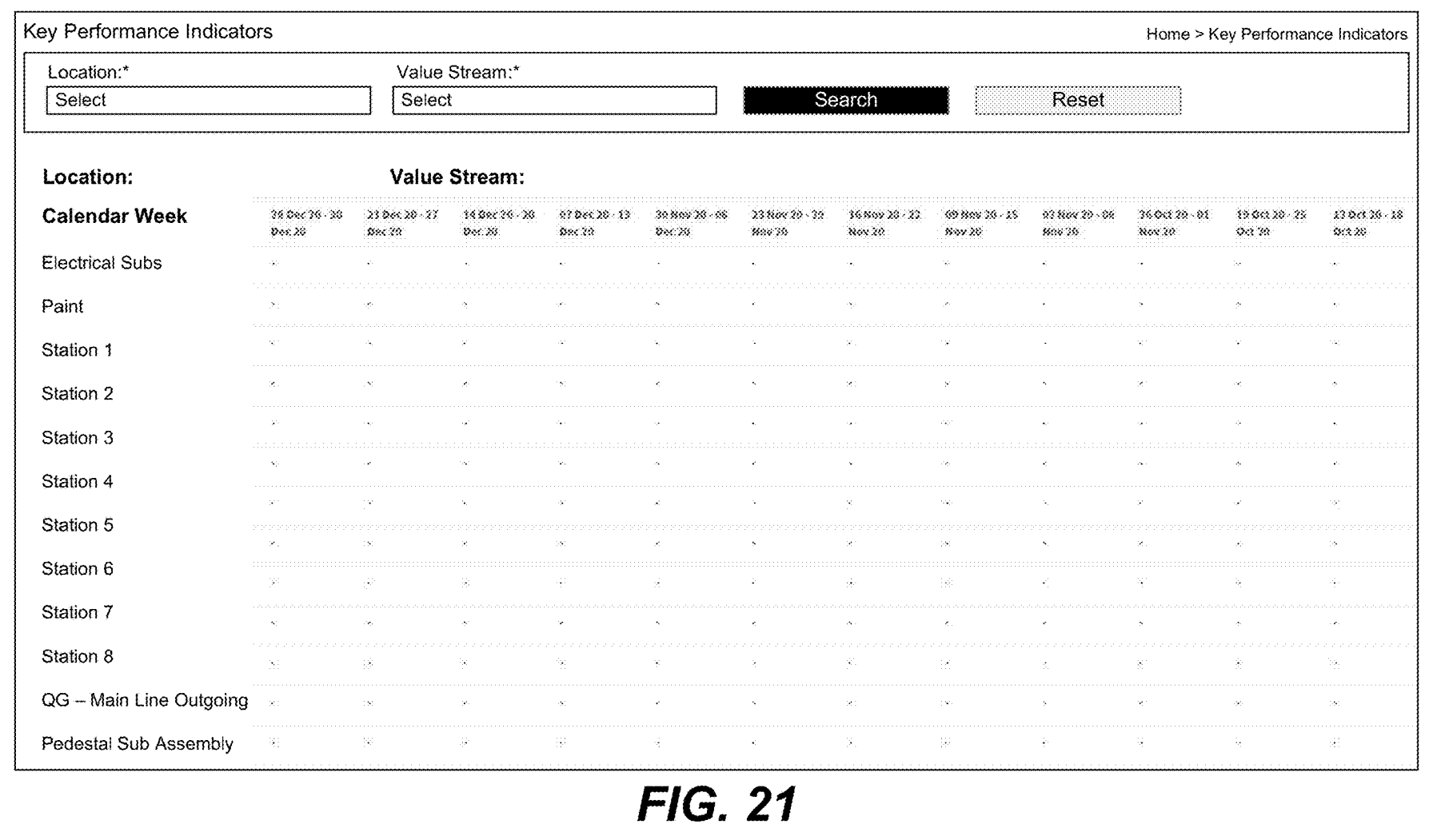

Turning next to FIG. 21, an example of a user interface is shown showing key performance indicators for various processes in a manufacturing operation or other desired operation according to various embodiments.

Figure 22:
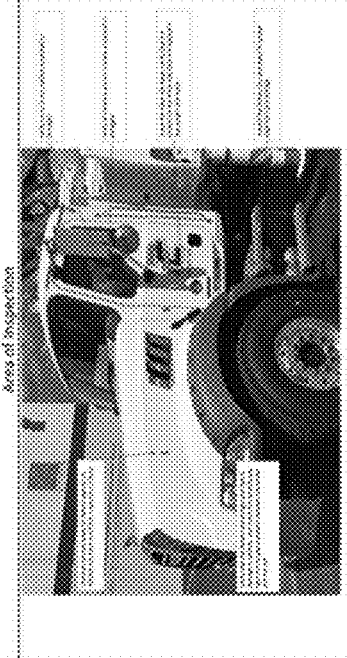

FIGS. 22-24 are examples of a user interface for defect tracking, follow-through, RCCA, and analytics according to various embodiments. The defect dashboard shown in FIGS. 22-24 is an easy to use, one stop location to manage all open defects. Defects are worked through a multi-step (e.g., three step) closure process. In some embodiments, units will not be allowed for be signed off if all defects associated with that production order are not closed. As shown in FIGS. 22 and 14, images may be embedded to improve the accuracy of inspections.

Figure 25:
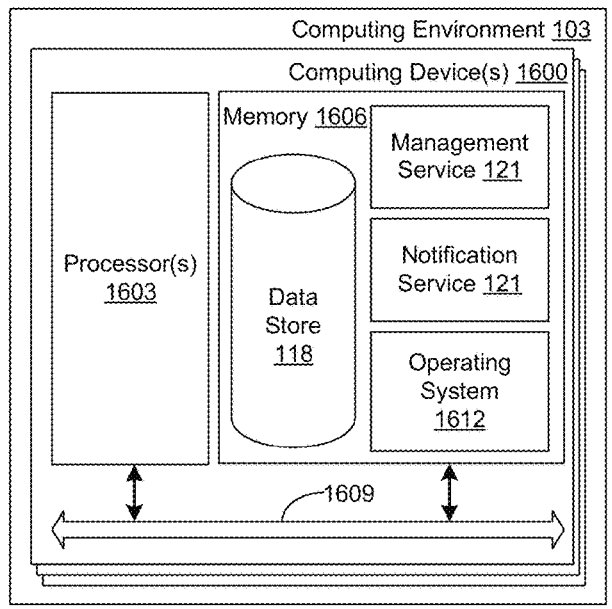
FIGS. 25-28 are schematic block diagrams that provide example illustrations of a computing environment, an administrator client device, a station client device, and a supervisor client device, respectively, employed in the networked environment of FIG. 1 according to various embodiments.

Turning to FIG. 25, shown is a schematic block diagram of the computing environment 103 according to an embodiment of the present disclosure. The computing environment 103 includes one or more computing devices 1600. Each computing device 1600 includes at least one processor circuit, for example, having a processor 1603 and a memory 1606, both of which are coupled to a local interface 1609. To this end, each computing device 1600 may comprise, for example, a smartphone, a tablet computer, a laptop computer, a video game console, a set-top box, a mobile gaming device, or like device. The local interface 1609 may comprise, for example, a data bus with an accompanying address/control bus or other bus structure as may be appreciated.

Stored in the memory 1606 are both data and several components that are executable by the processor 1603. In particular, stored in the memory 1606 and executable by the processor 1603 are the value stream management service 121, the notification service 124, and other computing environment applications. Also stored in the memory 1606 may be the data store 118 and other data. In addition, an operating system 1612 may be stored in the memory 1606 and executable by the processor 1603. It is understood that there may be other applications that are stored in the memory 1606 and are executable by the processor 1603 as may be appreciated.

Figure 26:
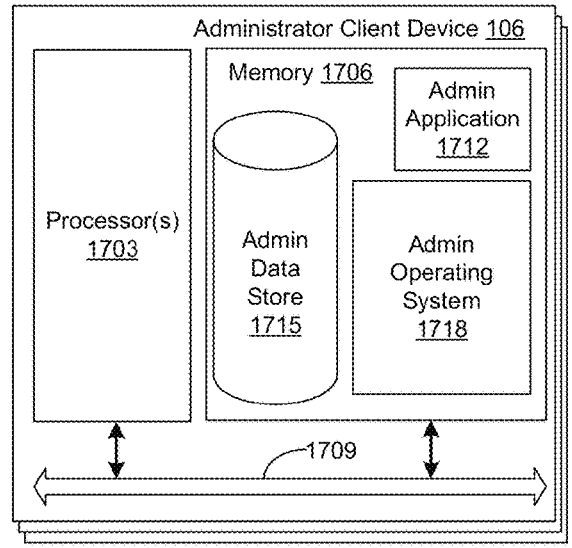

Turning to FIG. 26, shown is a schematic block diagram of the administrator client device 106 according to an embodiment of the present disclosure. The administrator client device 106 includes at least one processor circuit, for example, having a processor 1703 and a memory 1706, both of which are coupled to a local interface 1709. To this end, the administrator client device 106 may comprise, for example, a smartphone, a tablet computer, a laptop computer, a video game console, a set-top box, a mobile gaming device, or like device. The local interface 1709 may comprise, for example, a data bus with an accompanying address/control bus or other bus structure as may be appreciated.

Stored in the memory 1706 are both data and several components that are executable by the processor 1703. In particular, stored in the memory 1706 and executable by the processor 1703 are the admin application 1712 and other computing environment applications. Also stored in the memory 1706 may be the admin data store 1715 and other data. In addition, an operating system 1718 may be stored in the memory 1706 and executable by the processor 1703. It is understood that there may be other applications that are stored in the memory 1706 and are executable by the processor 1703 as may be appreciated.

Figure 27:
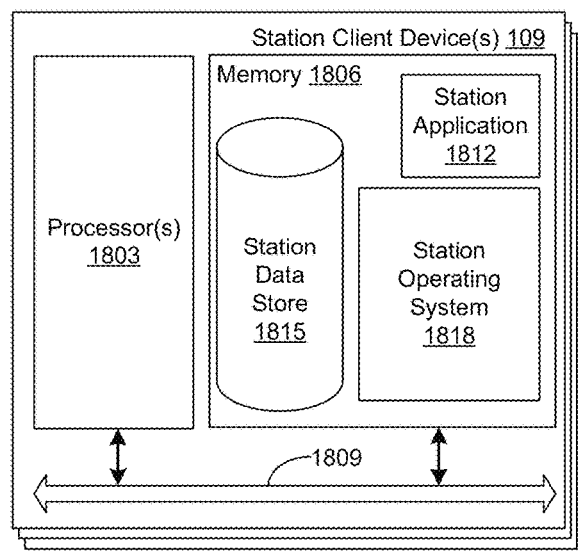

Turning now to FIG. 27, shown is a schematic block diagram of the station client device 109 according to an embodiment of the present disclosure. The station client device 109 includes at least one processor circuit, for example, having a processor 1803 and a memory 1806, both of which are coupled to a local interface 1809. To this end, the station client device 109 may comprise, for example, a smartphone, a tablet computer, a laptop computer, a video game console, a set-top box, a mobile gaming device, or like device. The local interface 1809 may comprise, for example, a data bus with an accompanying address/control bus or other bus structure as may be appreciated.

Stored in the memory 1806 are both data and several components that are executable by the processor 1803. In particular, stored in the memory 1806 and executable by the processor 1803 are the station application 1812 and other computing environment applications. Also stored in the memory 1806 may be the admin data store 1815 and other data. In addition, an operating system 1818 may be stored in the memory 1806 and executable by the processor 1803. It is understood that there may be other applications that are stored in the memory 1806 and are executable by the processor 1803 as may be appreciated.

Figure 28:
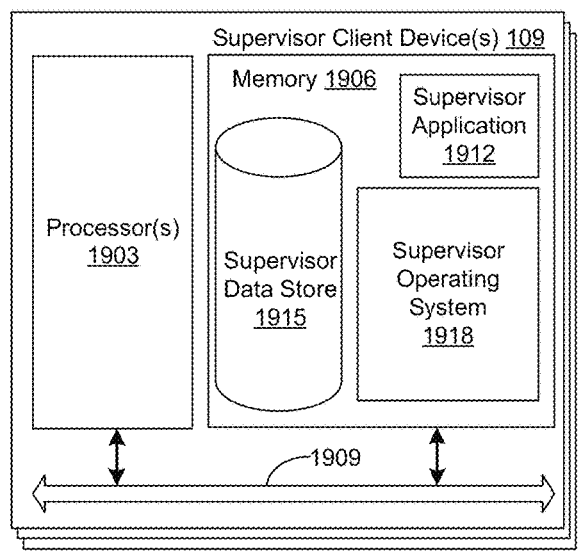

Moving along to FIG. 28, shown is a schematic block diagram of the supervisor client device 112 according to an embodiment of the present disclosure. The supervisor client device 112 includes at least one processor circuit, for example, having a processor 1903 and a memory 1906, both of which are coupled to a local interface 1909. To this end, the supervisor client device 112 may comprise, for example, a smartphone, a tablet computer, a laptop computer, a video game console, a set-top box, a mobile gaming device, or like device. The local interface 1909 may comprise, for example, a data bus with an accompanying address/control bus or other bus structure as may be appreciated.

Stored in the memory 1906 are both data and several components that are executable by the processor 1903. In particular, stored in the memory 1906 and executable by the processor 1903 are the supervisor application 1912 and other computing environment applications. Also stored in the memory 1906 may be the admin data store 1915 and other data. In addition, an operating system 1918 may be stored in the memory 1906 and executable by the processor 1903. It is understood that there may be other applications that are stored in the memory 1906 and are executable by the processor 1903 as may be appreciated.

Where any component discussed herein is implemented in the form of software, any one of a number of programming languages may be employed such as, for example, C, C++, C#, Objective C, Java®, JavaScript®, Perl, PHP, Visual Basic™, Python®, Ruby, Flash®, Angular, or other programming languages.

A number of software components are stored in the memory and are executable by the processors. In this respect, the term "executable" means a program file that is in a form that may ultimately be run by the processors. Examples of executable programs may be, for example, a compiled program that may be translated into machine code in a format that may be loaded into a random access portion of the memory and run by the processors, source code that may be expressed in proper format such as object code that is capable of being loaded into a random access portion of the memory and executed by the processors, or source code that may be interpreted by another executable program to generate instructions in a random access portion of the memory to be executed by the processors, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors may represent multiple processors and/or multiple processor cores and the memory may represent multiple memories that operate in parallel processing circuits, respectively. In such a case, the local interface may be an appropriate network that facilitates communication between any two of the multiple processors, between any of the processors and any of the memories, or between any two of the memories, etc. The local interface may comprise additional systems designed to coordinate this communication, including, for example, performing load balancing. The processors may be of electrical or of some other available construction.

Although the value stream management service 121, the notification service 124, the admin application 1712, the station application 1812, the supervisor application 1912, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the value stream management service 121, the notification service 124, the admin application 1712, the station application 1812, and the supervisor application 1912, that comprises software or code may be embodied in any non-transitory computer-readable medium for use by or in connection with an instruction execution system such as, for example, a processor in a computer system or other system. In this sense, the logic may comprise, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the value stream management service 121, the notification service 124, the admin application 1712, the station application 1812, and the supervisor application 1912, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in a same computing device 1600 or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising at least one hardware processor;
   program instructions stored in memory executable by the at least one computing device that, when executed, direct the at least one computing device to:
   receive a stream of metrics from a plurality of station computing devices each positioned at one of a plurality of stations in a manufacturing process, individual ones of the station computing devices comprising at least one sensor configured to generate metrics in the stream of metrics;
   determine an optimal allocation of resources for each of the stations in the manufacturing process based at least in part on the metrics in the stream of metrics and display the optimal allocation of resources in at least one user interface;
   determine that a first cycle time of a first one of the stations exceeds a threshold based at least in part on an analysis of a first subset of the stream of metrics corresponding to the first one of the stations;
   determine that a second cycle time of a second one of the stations falls below a threshold based at least in part on an analysis of a second subset of the stream of metrics corresponding to the second one of the stations;
   in response to the cycle time for the second one of the stations falling below the threshold, identify a plurality of entries in a job assignment database corresponding to the second one of the stations;
   select at least one of the entries in the job assignment database based at least in part on a cross-training metric generated that corresponds to the at least one entry; and
   send a notification to an administrator client device that comprises a recommended action for the second one of the stations determined based at least in part on the at least one of the entries in the job assignment database.

2. The system of claim 1, wherein the metrics in the stream of metrics comprise timestamp data received from the station computing devices at a predefined time interval.

3. The system of claim 2, wherein the at least one computing device is further directed to:
   determine the cycle time for the first one of the stations based at least in part on at least one first station job-in event, wherein the at least one first station job-in event is extracted from the timestamp data; and
   determine the cycle time for the second one of the stations based at least in part on at least one second station job-in event and at least one second station job-out event, wherein the at least one second station job-in event and the at least one second station job-out event are extracted from the timestamp data.

4. The system of claim 1, wherein the at least one entry from the plurality of entries in the job assignment database is selected based on a status of the second one of the stations and a status of at least one respective queue associated with the second one of the stations.

5. The system of claim 2, wherein the at least one computing device is further directed to:
   determine a status of individual ones of the stations based at least in part on the timestamp data; and
   determine a status of individual queues of a plurality of queues associated with the stations based at least in part on the timestamp data.

6. The system of claim 1, wherein the at least one computing device is further directed to:
   encode for rendering on a user interface an indication of a status of individual stations of a plurality of stations; and
   encode for rendering on the user interface an indication of a status of individual queues of a plurality of queues associated with the stations.

7. The system of claim 1, wherein the recommended action comprises transferring at least one individual corresponding to the at least one entry from the second one of the stations to the first one of the stations.

8. The system of claim 1, wherein the cross-training metric comprises an indication that an employee is fully-trained, in-training, or untrained with respect to a process associated with the second one of the stations.

9. The system of claim 2, wherein the at least one computing device is further directed to:
   access a timestamp dataset from a data store, the timestamp dataset comprising timestamp data for a plurality of intervals over a period of time;
   determine an underperformance frequency for respective ones of the stations based at least in part on the timestamp data, the underperformance frequency comprising a frequency that a cycle time of the respective stations fell below the threshold over the period of time; and
   determine that a third one of the stations has a highest underperformance frequency among the plurality of stations.

10. The system of claim 1, wherein the at least one computing device is further directed to:
    generate at least one user interface comprising a value stream map; and
    dynamically update the value stream map as updated metrics in the stream of metrics are received.

11. A computer-implemented method, comprising:
    receiving a stream of metrics from a plurality of station computing devices each positioned at one of a plurality of stations in a manufacturing process, individual ones of the station computing devices comprising at least one sensor configured to generate metrics in the stream of metrics;
    determining an optimal allocation of resources for each of the stations in the manufacturing process based at least in part on the metrics in the stream of metrics and displayed the optimal allocation of resources in at least one user interface;

determining that a first cycle time of a first one of the stations exceeds a threshold based at least in part on an analysis of a first subset of the stream of metrics corresponding to the first one of the stations;

determining that a second cycle time of a second one of the stations falls below a threshold based at least in part on an analysis of a second subset of the stream of metrics corresponding to the second one of the stations;

in response to the cycle time for the second one of the stations falling below the threshold, identifying a plurality of entries in a job assignment database corresponding to the second one of the stations;

selecting at least one of the entries in the job assignment database based at least in part on a cross-training metric generated that corresponds to the at least one entry; and sending a notification to an administrator client device that comprises a recommended action for the second one of the stations determined based at least in part on the at least one of the entries in the job assignment database.

12. The computer-implemented method of claim 11, wherein the metrics in the stream of metrics comprise timestamp data received from the station computing devices at a predefined time interval.

13. The computer-implemented method of claim 12, further comprising:

determining the cycle time for the first one of the stations based at least in part on at least one first station job-in event, wherein the at least one first station job-in event is extracted from the timestamp data; and determining the cycle time for the second one of the stations based at least in part on at least one second station job-in event and at least one second station job-out event, wherein the at least one second station job-in event and the at least one second station job-out event are extracted from the timestamp data.

14. The computer-implemented of claim 11, wherein the at least one entry from the plurality of entries in the job assignment database is selected based on a status of the second one of the stations and a status of at least one respective queue associated with the second one of the stations.

15. The computer-implemented of claim 12, further comprising:

determining a status of individual ones of the stations based at least in part on the timestamp data; and determining a status of individual queues of a plurality of queues associated with the stations based at least in part on the timestamp data.

16. The computer-implemented of claim 11, further comprising:

encoding for rendering on a user interface an indication of a status of individual stations of a plurality of stations; and encoding for rendering on the user interface an indication of a status of individual queues of a plurality of queues associated with the stations.

17. The computer-implemented of claim 11, wherein the recommended action comprises transferring at least one individual corresponding to the at least one entry from the second one of the stations to the first one of the stations.

18. The computer-implemented of claim 11, wherein the cross-training metric comprises an indication that an individual is fully-trained, in-training, or untrained with respect to a process associated with the second one of the stations.

19. The computer-implemented of claim 12, further comprising:

accessing a timestamp dataset from a data store, the timestamp dataset comprising timestamp data for a plurality of intervals over a period of time;

determining an underperformance frequency for respective ones of the stations based at least in part on the timestamp data, the underperformance frequency comprising a frequency that a cycle time of the respective stations fell below the threshold over the period of time; and determining that a third one of the stations has a highest underperformance frequency among the plurality of stations.

20. The computer-implemented of claim 11, further comprising:

generating the at least one user interface to comprise a value stream map; and dynamically updating the value stream map as updated metrics in the stream of metrics are received.

* * * * *